(12) United States Patent
Nagahara et al.

(10) Patent No.: US 7,605,985 B2
(45) Date of Patent: Oct. 20, 2009

(54) PROJECTION ZOOM LENS AND PROJECTION TYPE DISPLAY DEVICE

(75) Inventors: Akiko Nagahara, Saitama (JP); Hiroshi Yamada, Saitama (JP)

(73) Assignee: Fujinon Corporartion, Saitama-Shi (JP)

( * ) Notice: Subject to any disclaimer, the term of this patent is extended or adjusted under 35 U.S.C. 154(b) by 0 days.

(21) Appl. No.: 12/277,120

(22) Filed: Nov. 24, 2008

(65) Prior Publication Data

US 2009/0135497 A1    May 28, 2009

(30) Foreign Application Priority Data

Nov. 26, 2007    (JP)    ............... P2007-304318

(51) Int. Cl.
*G02B 15/14* (2006.01)

(52) U.S. Cl. ............... 359/680; 359/681; 359/682; 359/683; 359/713; 359/740; 359/749; 359/752; 359/761

(58) Field of Classification Search ......... 359/680–683, 359/713, 740, 749, 752, 761
See application file for complete search history.

(56) References Cited

U.S. PATENT DOCUMENTS 6,633,436 B2 * 10/2003 Wada et al. ............... 359/681

| 7,190,528 | B2 * | 3/2007 | Inoko ............ 359/649 |
| 7,215,477 | B2 * | 5/2007 | Yamasaki et al. ....... 359/649 |
| 7,403,339 | B2 * | 7/2008 | Inoko ............ 359/680 |
| 2008/0074756 | A1 | 3/2008 | Yamamoto |
| 2008/0231962 | A1 | 9/2008 | Yamada |
| 2008/0231967 | A1 * | 9/2008 | Inoko ............ 359/676 |

FOREIGN PATENT DOCUMENTS

| JP | 8-201690 A | 8/1996 |
| JP | 2008-46259 A | 2/2008 |
| JP | 2008-83229 A | 4/2008 |

* cited by examiner

*Primary Examiner*—Evelyn A. Lester
(74) *Attorney, Agent, or Firm*—Birch, Stewart, Kolasch & Birch, LLP

(57) ABSTRACT

A projection zoom lens is provided and includes: in order from the magnification side, a negative first lens group performing focusing with being fixed during power-varying; a positive second lens group, a positive third lens group, a positive fourth lens group, a positive fifth lens group, which are moved with correlation; and a positive sixth lens group fixed during the power-varying. An aperture diaphragm is moved between the fourth lens group and the fifth lens group during the power-varying to keep Fno constant in the whole power-varying region. In addition, the expression of 1.7<Bf/f<3.0 is satisfied, where f is a focal length of the whole system, and Bf is a back focal length (air conversion distance) of the whole system.

18 Claims, 19 Drawing Sheets

EXAMPLE 1 (WIDE)

EXAMPLE 1

WIDE

MIDDLE

TELE

EXAMPLE 2 (WIDE)

EXAMPLE 2

WIDE

MIDDLE

TELE

EXAMPLE 3 (WIDE)

EXAMPLE 3

WIDE

MIDDLE

TELE

EXAMPLE 4 (WIDE)

EXAMPLE 4

WIDE

MIDDLE

TELE

EXAMPLE 5 (WIDE)

EXAMPLE 5

WIDE

MIDDLE

TELE

EXAMPLE 6 (WIDE)

EXAMPLE 6

WIDE

MIDDLE

TELE

EXAMPLE 1

(WIDE)

(MIDDLE)

(TELE)

EXAMPLE 2

(WIDE)

(MIDDLE)

(TELE)

EXAMPLE 3

(WIDE)

(MIDDLE)

(TELE)

EXAMPLE 4

(WIDE)

(MIDDLE)

(TELE)

EXAMPLE 4

(WIDE)

(MIDDLE)

(TELE)

EXAMPLE 6

(WIDE)

(MIDDLE)

(TELE)

PROJECTION ZOOM LENS AND PROJECTION TYPE DISPLAY DEVICE

This application is based on and claims priority under 35 U.S.C §119 from Japanese Patent Application No. 2007-304318, filed on Nov. 26, 2007, the entire disclosure of which is herein incorporated by reference.

BACKGROUND OF THE INVENTION

1. Field of the Invention

The present invention relates a projection zoom lens of a 6-group configuration and 4-group movement mounted on a projection type display device or the like and a projection type display device having the projection zoom lens, and more particularly, to a projection zoom lens and a projection type display device suitable for projecting on the large screen in a movie theater or the like.

2. Description of Related Art

A projector device (projection type display device) having a relatively long back focal length using a light valve such as a liquid crystal display and a DMD display has come into wide use (see JP-A-8-201690).

Recently, in movie theaters, a projector that is suitable for a large screen and is capable of projecting a higher-precision picture has been used as such a projector device.

A reflection type liquid crystal display element or a DMD 3-sheet type is used for the projector device provided for such a use, and a longer back focal length and telecentricity as satisfactory as the other projectors are necessary.

In a projection zoom lens of such a projector device, when a focus group located on a magnification side is configured to have a positive refractive power and an angle of view is widened, a lens diameter of the magnification side becomes too large. Accordingly, in a point of view of widening the angle of view, it is preferable that the focus group located on the magnification side is configured to have a negative refractive power.

However, when the focus group located on the magnification side is configured to have a negative refractive power, it is difficult to keep Fno constant as increasing a zoom ratio.

In such a case, it is important to keep Fno constant by providing an aperture diaphragm, in the zoom lens group.

As a zoom lens, in which a focus group located on a magnification side has a negative refractive power and an aperture diaphragm is provided in a zoom lens group, there is a zoom lens described in JP-A-2008-46259 and JP-A-2008-83229.

In the zoom lens described in JP-A-2008-46259, an aperture diaphragm is provided in a movement group to keep Fno substantially constant. However, in this case, it is necessary to largely change a diameter of the aperture diaphragm, and thus it is complicated to operate the aperture diaphragm.

In the zoom lens described in JP-A-2008-83229, an aperture diaphragm is moved independently from lenses during zooming. However, a diameter of the aperture diaphragm is not changed, and thus Fno is changed during zooming.

SUMMARY OF THE INVENTION

An object of an illustrative, non-limiting embodiment of the invention is to provide a telecentric projection zoom lens and a projection type display device having a proper back focal length, capable of easily widening an angle of view, capable of easily keeping Fno substantially constant in the whole region of power-varying even in a state of widening an angle of view, and having a high zoom ratio and high compatibility.

According to an aspect of the invention, there is provided a projection zoom lens including, in order from a magnification side thereof: a first lens group having a negative refractive power and adapted to perform focusing with being fixed during power-varying of the zoom lens; a second lens group having a positive refractive power and adapted to move during the power-varying; a third lens group having a positive refractive power and adapted to move during the power-varying; a fourth lens group having a positive refractive power and adapted to move during the power-varying; a fifth lens group having a positive refractive power and adapted to move during the power-varying; and a sixth lens group having a positive refractive power and adapted to be fixed during the power-varying. Further, a stop adapted to independently move during the power-varying is provided between the fourth lens group and the fifth lens group, and a reduction side of the zoom lens is configured to be telecentric. Furthermore, Fno is constant in the whole region of the power-varying, and wherein the following conditional (1) is satisfied:

$$1.7 < Bf/f < 3.0 \tag{1},$$

wherein f is a focal length of the whole lens system at a wide angle end, and Bf is a back focal length of the whole lens system (air conversion distance).

The "stop" may include a variable aperture diaphragm having a variable diameter, in addition to a so-called aperture diaphragm having a fixed diameter.

The stop may be moved independently from the lens groups during the power-varying, an aperture diameter of the stop may be constant, and the following conditional expression (2) may be satisfied:

$$0.8 < (f_{1-5} T \times D_1 W)/(f_{1-4} W \times D_2 T) < 2.5 \tag{2}$$

where $f_{1-4}W$ is a composite focal length from the first lens group to the fourth lens group at the wide angle end, $f_{1-5}T$ is a composite focal length from the first lens group to the fifth lens group at a telephoto end, $D_1W$ is a distance between the fourth lens group and the fifth lens group at the wide angle end, and $D_2T$ is a distance between the fifth lens group and the sixth lens group at the telephoto end.

Each lens may be formed of a single lens.

The following conditional expression (3) may be satisfied:

$$3.0 < f4/f < 6.0 \tag{3}$$

where f4 is a focal length of the fourth lens group.

The following conditional expression (4) may be satisfied:

$$1.0 < f_{5-6}/Bf < 1.5 \tag{4}$$

where $f_{5-6}$ is a composite focal length of the fifth lens group and the sixth lens group.

The fourth lens group may be one biconvex lens, and the following conditional expression (5) may be satisfied:

$$70 < vd1 \tag{5}$$

where vd1 is an Abbe number of the biconvex lens of the fifth lens group at the d-line.

The fifth lens group may include, in order from the magnification side, a negative lens having a concave surface on the magnification side, a negative lens having a convex surface on the magnification side, and three positive lenses having convex surfaces on the reduction side.

The following conditional expressions (6) and (7) may be satisfied:

$$40 < vd2 \tag{6}$$

$$1.8 < Nd2 \tag{7}$$

where vd2 is an Abbe number of the negative lens having the concave surface facing the magnification side in the fifth lens group at the d-line, and Nd2 is a refractive index of the negative lens having the concave surface facing the magnification side in the fifth lens group at the d-line.

The following conditional expression (8) may be satisfied:

$$70 < vd3 \qquad (8)$$

where vd3 is an Abbe number of the positive lens having the convex surface on the reduction side in the fifth lens group at the d-line.

In addition, according to an aspect of the invention, there is provided a projection type display device including: a light source; a light valve; and the projection zoom lens as a projection lens for projecting an optical image onto a screen by light modulated by the light valve.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

In a projection zoom lens and a projection type display device using the same according to an exemplary embodiment of the invention, the 6-group configuration and 4-group movement type zoom lens includes, in order from the magnification side, the first lens group having a negative refractive power and performing focusing with being fixed during power-varying of the system; the second lens group, the third lens group, the fourth lens group, and the fifth lens group, which are moved during the power-varying; and the sixth lens group fixed during the power-varying. The first lens group for focusing is the negative lens group, and the Fno of the system is kept constant in the whole power-varying region by moving the stop between the fourth lens group and the fifth lens group during the power-varying.

With such a configuration, it is easy to widen an angle of view of the zoom lens while keeping a high zoom ratio, and it is possible to easily keep Fno substantially constant in the whole region of power-varying, even in a state of widening the angle of view.

Therefore, in the case where the projection zoom lens is used in a large projection space such as a movie theater, even when a projection lens only for each projection distance according to the size of the theater is not used, it is possible to widely cope with the situation using one projection lens in a range, and it is possible to project a picture having the same size onto a screen with the same brightness in any movie theater.

Using the aforementioned high zoom ratio, it is possible to project a picture having a length-width radio varied according to zooming with only the width changed, while keeping a height constant.

Since the back focal length of the whole system is set within an intended range, it is possible to secure a space suitable for inserting a glass block as color composing units such as a cross dichroic prism and a TIR prism.

In addition, according to the projection zoom lens and the projection type display device, it is possible to satisfy the demand that telecentricity of the lens system on the reduction side is good.

Figure 1:
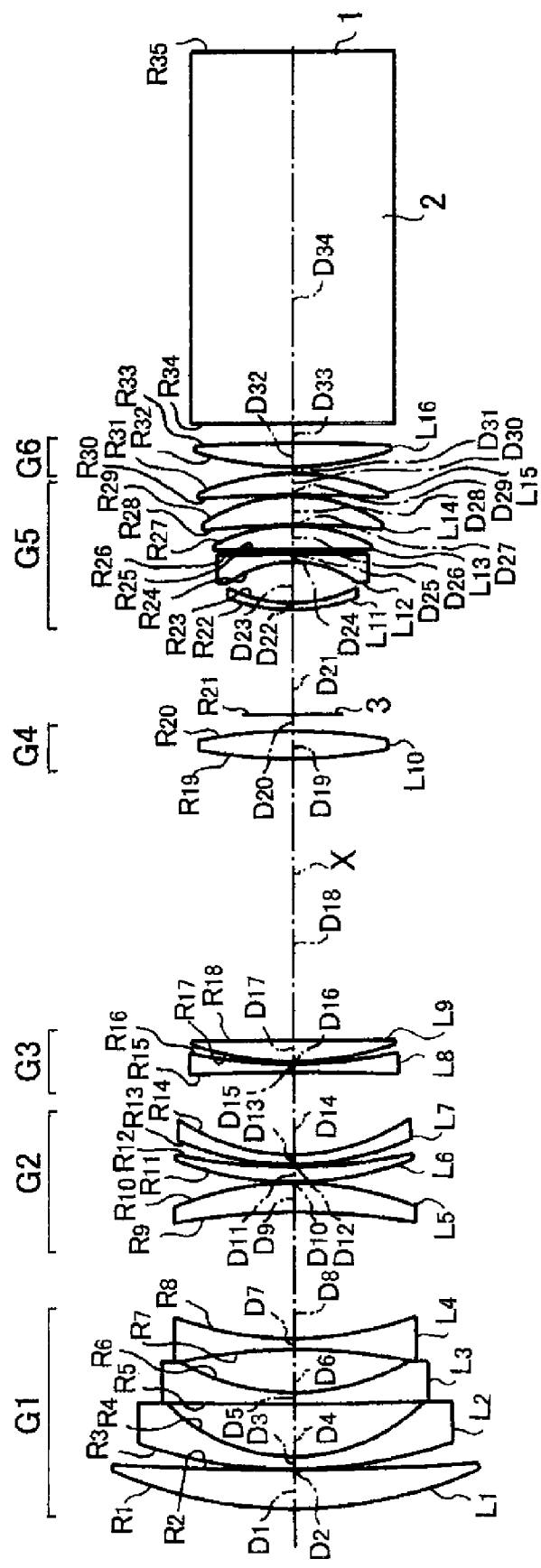
FIG. 1 is a diagram illustrating a projection zoom lens according to Example 1.
Figure 2:
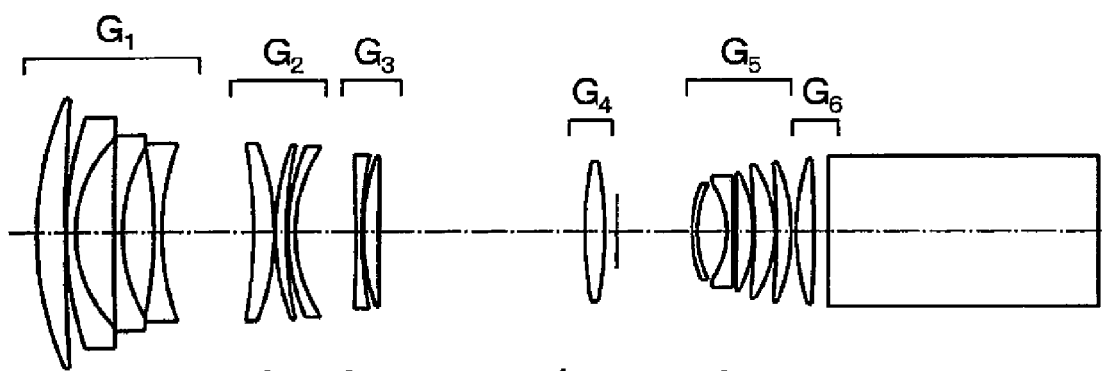
FIG. 2 is a diagram illustrating movement positions of lens groups at a wide angle end (WIDE), a middle position (MIDDLE), and a telephoto end (TELE) of the projection zoom lens according to Example 1.
Figure 2:
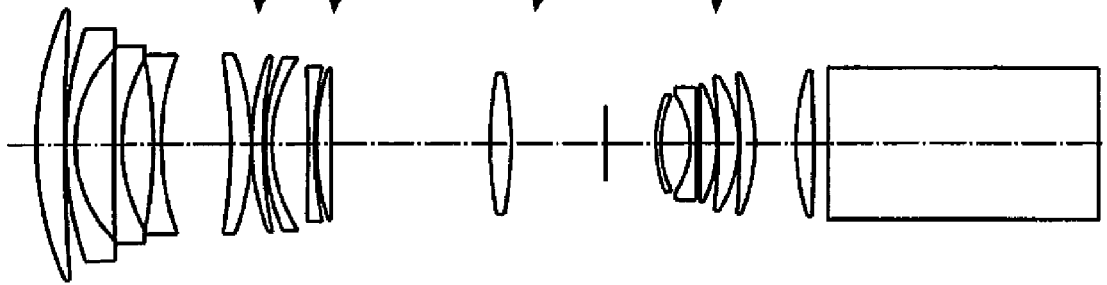
Figure 2:
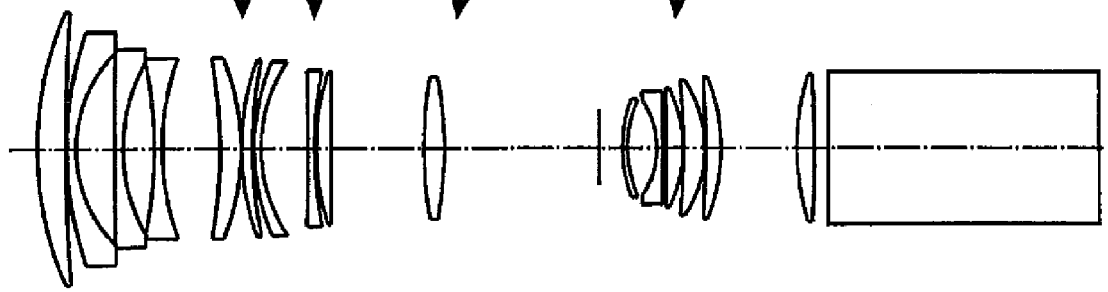

Hereinafter, an exemplary embodiment of the invention will be described with reference to the drawings. FIG. 1 is a diagram illustrating a zoom lens according to Example 1 of the invention, and FIG. 2 is a diagram illustrating a movement trace of the zoom lens according to Example 1 by power-varying. Hereinafter, the embodiment will be described by considering this lens as a representative example.

That is, this lens is used as a projection zoom lens mounted on a projection type display device for projecting a digital image. The lens includes, in order from a magnification side, a first lens group $G_1$ having a negative refractive power and having a focusing function with being fixed during power-varying of the system; a second lens group $G_2$ having a positive refractive power, a third lens group $G_3$ having a positive refractive power, a fourth lens group $G_4$ having a positive refractive power, a fifth lens group $G_5$ having a positive refractive power, which are moved with con-elation for continuous power-varying and correction of shift of an image surface caused by the continuous power-varying; and a sixth lens group $G_6$ having a positive refractive power and fixed during the power-varying.

As shown in FIG. 1, the first lens group $G_1$ includes four lenses $L_1$ to $L_4$ (five lenses in Example 6), the second lens group $G_2$ includes three lenses $L_5$ to $L_7$ (two lenses in Example 2), the third lens group $G_3$ includes two lenses $L_8$ and $L_9$ (one lens in Example 2), the fourth lens group $G_4$ includes one lens $L_{10}$, the fifth lens group $G_5$ includes five lenses $L_{11}$ to $L_{15}$, and the sixth lens group $G_6$ includes one lens $L_{16}$.

An aperture diaphragm 3 that is a real aperture diaphragm is disposed between the fourth lens group $G_4$ and the fifth lens group $G_5$. During power-varying, in the whole region of the power-varying, the aperture diaphragm 3 is configured to move independently from the lens groups so that Fno is kept substantially constant.

Accordingly, the aperture diaphragm 3 is moved during power-varying, and thus speed (Fno) of the lens system is kept constant irrespective of a zooming position.

Therefore, even when a projection distance is varied according to movie theaters as a case where the lens is mounted on a projection type display device used to show a movie in a movie theater, the second lens group $G_2$, the third lens group $G_3$, the fourth lens group $G_4$, and the fifth lens group $G_5$ are moved along an optical axis to perform a power-varying operation, and the first lens group $G_1$ is moved along the optical axis to perform focusing, and thus it is possible to projecting a picture with good image quality onto a large screen with the same brightness as required.

In addition, a value obtained by dividing a back focal length Bf (air conversion distance) of the lens system by a focal length f of the lens system satisfies the following conditional expression (1).

$$1.7 < Bf/f < 3.0 \quad (1)$$

Accordingly, in a projection zoom lens according to the embodiment, since the back focal length of the lens system is set to satisfy the conditional expression (1), it is possible to secure a space suitable for inserting a glass block as color composing units such as a cross dichroic prism and a TIR prism.

In the embodiment as described above, a cemented lens is not provided, and all lenses are single lenses. The reason is that the device according to the embodiment is configured to output very strong light of about 2 kW using a xenon lamp or the like as a light source, differently from a device for home use or small-scale meeting, and thus adhesives for cementing lenses may seriously deteriorate by such strong light. That is, the reason is to prevent decrease in performance of the lens in such a point.

In the embodiment, during power-varying, the second lens group $G_2$, the third lens group $G_3$, the fourth lens group $G_4$, and the fifth lens group $G_5$ are configured to be moved along the optical axis as shown in FIG. 2.

In addition, the sixth lens group $G_6$ is a relay lens fixed during power-varying, a color composing prism 2 is disposed between the sixth lens group $G_6$ and a liquid crystal display panel 1. In the figures, X denotes an optical axis.

The projection zoom lens preferably satisfies the following conditional expressions (2) to (8).

$$0.8 < (f_{1-5}T \times D_1W)/(f_{1-4}W \times D_2T) < 2.5 \quad (2)$$

$$3.0 < f4/f < 6.0 \quad (3)$$

$$1.0 < f_{5-6}/Bf < 1.5 \quad (4)$$

$$70 < vd1 \quad (5)$$

$$40 < vd2 \quad (6)$$

$$1.8 < Nd2 \quad (7)$$

$$70 < vd3 \quad (8)$$

where $f_{1-4}W$: a composite focal length from the first lens group $G_1$ to the fourth lens group $G_4$ at the wide angle end $f_{1-5}T$: a composite focal length from the first lens group $G_1$ to the fifth lens group $G_5$ at a telephoto end $D_1W$: a distance between the fourth lens group $G_4$ and the fifth lens group $G_5$ at the wide angle end $D_2T$: a distance between the fifth lens group $G_5$ and the sixth lens group $G_6$ at the telephoto end f: a focal length of the whole lens system at a wide angle end f4: a focal length of the fourth lens group $G_4$ $f_{5-6}$: a composite focal length of the fifth lens group $G_5$ and the sixth lens group $G_6$ vd1: an Abbe number of the biconvex lens of the fourth lens group $G_4$ at the d-line vd2: an Abbe number of the negative lens having the concave surface facing the magnification side in the fifth lens group $G_5$ at the d-line vd3: an Abbe number of the positive lens having the convex surface facing the reduction side in the fifth lens group $G_5$ at the d-line.

Nd2: a refractive index of the negative lens having the concave surface facing the magnification side in the fifth lens group $G_5$ at the d-line.

Next, technical meanings of the conditional expressions (1) to (8) will be described.

As described above, the conditional expression (1) is to prescribe a proper range of a back focal length to insert a glass block for color composition such as a dichroic prism and a TIR prism, while complying with a request of making a device compact. Particularly, the lower limit is a minimum back focal length necessary for inserting the glass block for color composition.

The conditional expression (2) is to prescribe a range necessary for keeping an aperture diameter substantially constant while keeping lens performance satisfactory. That is, when the value is lower than the lower limit of the range, it gets dark on the telephoto end side. When the value of the conditional expression gets larger, a distance between the lens groups gets larger. Accordingly, the total length gets too long or a diameter of the lens group on the magnification side gets too large. Therefore, it is preferable to set the upper limit as prescribed in the conditional expression (2).

In the configuration, to keep the aperture diameter constant, it is important that the aperture diaphragm, is located at a position where the aperture diameter becomes larger than a diameter of a real aperture diaphragm at the wide angle end, and the aperture diaphragm is located at a position where the aperture diameter becomes smaller than a diameter of the real aperture diaphragm at the telephoto end. A ray height determining Fno in a range where the aperture diaphragm is movable becomes large on the magnification side. Accordingly, in the range, a condition to keep the aperture diameter constant is that the ray height on the magnification side at the wide angle end is set larger than the ray height on the reduction side at the telephoto end.

Therefore, the conditional expression (2) is prescribed to keep such a state and to realize satisfactory optical performance.

The conditional expression (3) is to prescribe power of the fourth lens group $G_4$. That is, the conditional expression (3) reduces a lens movement amount during zooming, and prescribes a range to make all aberrations satisfactory. When the value is larger than the upper limit of the conditional expression (3), the movement amount of the lens group is too large. In addition, when the size of the lens is tried to be reduced, a power balance with the other group deteriorates, and thus it is difficult to correct aberrations. When the value is smaller than the lower limit, the aberration occurs too large in the fourth lens group $G_4$.

The conditional expression (4) is to prescribe a composite focal length of the fifth lens group $G_5$ and the sixth lens group $G_6$, and to make an angle of a ray in the vicinity of the aperture diaphragm appropriate.

That is, when the value is larger than the upper limit of the conditional expression (4), the whole system becomes too large. Accordingly, in a state of keeping the diameter of the aperture diaphragm constant, it is difficult to keep Fno substantially constant while keeping a telecentric state of the lens system on the reduction side. When the value is smaller than the lower limit, the first lens group $G_1$ becomes too large.

The conditional expression (5) is to prescribe a range of an Abbe number of the biconvex lens (tenth lens $L_{10}$ in Example 1) of the fourth lens group $G_4$ at the d-line, and to prescribe a range of keeping a longitudinal chromatic aberration satisfactory in the whole zoom region. To have power necessary for power-varying and to suppress change of the longitudinal chromatic aberration caused by the movement of the lens, it is required to use a lens material having a large Abbe number, and such a requirement can be satisfied by the large Abbe number satisfying the conditional expression (5).

The conditional expression (6) is to prescribe a range of an Abbe number of the negative lens (twelfth lens $L_{12}$ in Example 1) having a concave surface on the magnification side at the d-line in the fifth lens group $G_5$. A chromatic aberration can be satisfactorily corrected by the large Abbe number satisfying the conditional expression (6). That is, when the value is larger than the lower limit, it is possible to keep both of a longitudinal chromatic aberration and a lateral chromatic aberration satisfactory during power-varying.

The conditional expression (7) is to prescribe a range of a refractive index of the negative lens (twelfth lens $L_{12}$ in Example 1) having a concave surface facing the magnification side at the d-line in the fifth lens group $G_5$. An aberration (particularly, spherical aberration) can be satisfactorily corrected by the high refractive index satisfying the condition expression (7) while having a necessary negative refractive index. That is, when the value is larger than the lower limit, it is possible to reduce the aberration occurring in the movement lens group during power-varying.

All aberrations including a chromatic aberration can be satisfactorily corrected by satisfying all of the conditional expressions (6) and (7).

The conditional expression (8) is to prescribe a range of an Abbe number of the positive lens (thirteenth lens $L_{13}$ to fifteenth lens $L_{15}$ in Example 1) having a convex surface on the reduction side at the d-line in the fifth lens group $G_5$. An aberration, particularly, a spherical aberration can be satisfactorily corrected by the large Abbe number satisfying the condition expression (8). That is, when the value is larger than the lower limit, it is possible to keep the aberration satisfactory during power-varying.

In the embodiment, speed is prescribed by the aperture diaphragm 3 having the constant diameter. However, in the projection zoom lens of the invention, a variable aperture diaphragm may be used instead of the aperture diaphragm 3 (see modification example). When the aperture diameter is fixed, it is not easy to prevent relative illumination from decreasing at both of the wide angle end and the telephoto end. However, it is possible to easily keep Fno constant even at any one of the wide angle end and the telephoto end by using such a variable aperture diaphragm.

Figure 19:
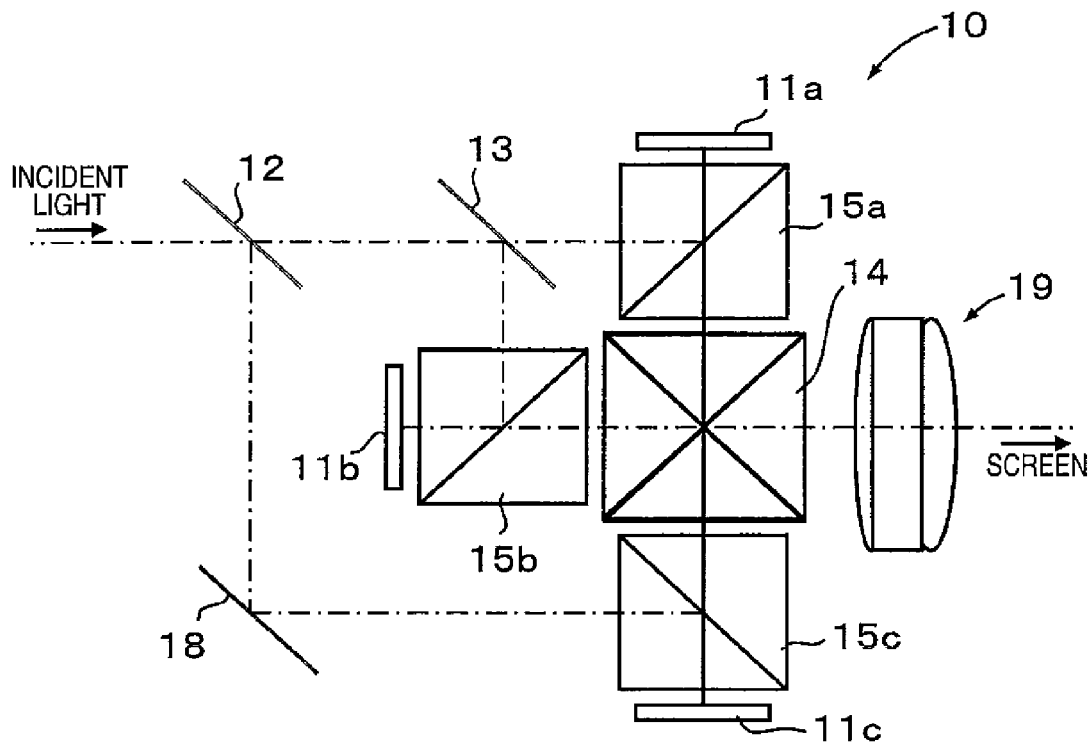
FIG. 19 is a schematic diagram illustrating a part of a projection type display device according to an exemplary embodiment of the invention.

A projection type display device according to the embodiment is provided with a light source, a reflection type liquid crystal display device, and the projection zoom lens according to the embodiment. The projection zoom lens according to the embodiment in the device serves as a projection lens for projecting an optical image of light modulated by the reflection type liquid crystal display device onto a screen. For example, as shown in FIG. 19, the device is provided with an illumination optical system 10. The illumination optical system 10 includes reflection type liquid crystal display devices 11a to 11c corresponding to colors of light, dichroic mirrors 12 and 13 for color split, a dichroic prism 14 for color composition, a total reflection mirror 18, and polarization split prisms 15a to 15c. A light source (not shown) is disposed at the front end of the dichroic mirror 12, white light enters the liquid crystal panels 11a to 11c corresponding to three color light beams (G light, B light, R light) from the light source. Then, the light is optically modulated and is projected to a screen (not shown) by the projection zoom lens 19.

Figure 20:
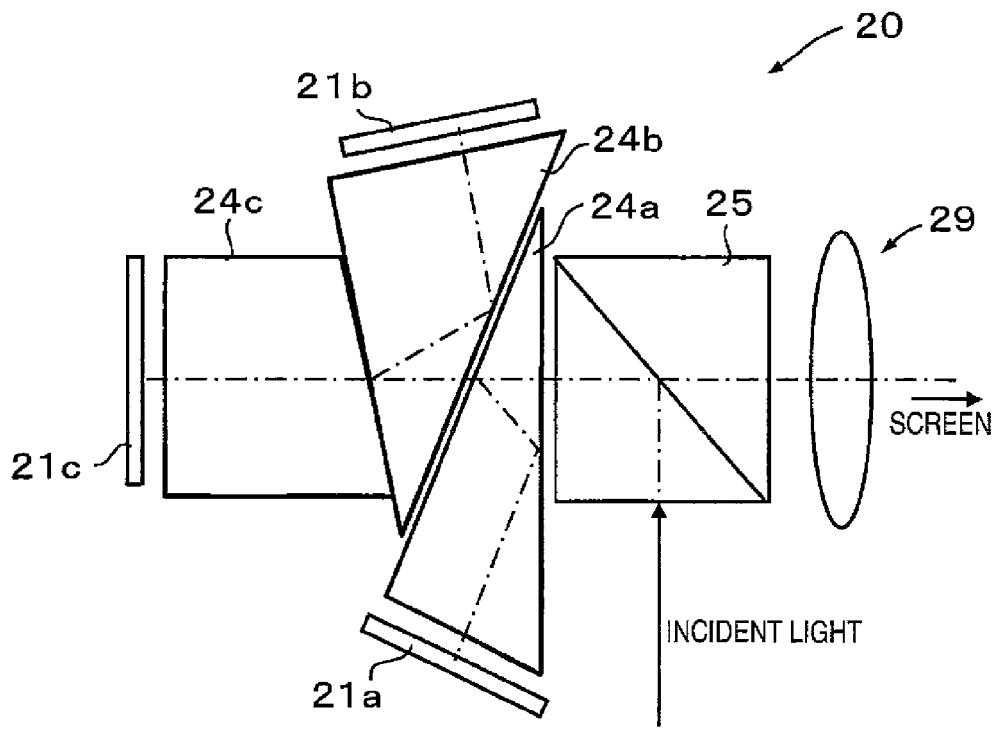
FIG. 20 is a schematic diagram illustrating a part of another projection type display device according to an exemplary embodiment of the invention.

As shown in FIG. 20, a device according to another embodiment is provided with an illumination optical system 20. The illumination optical system 20 includes reflection type liquid crystal display devices 21a to 21c corresponding to colors of light, TIR prisms 24a to 24c for color split and color composition, and a polarization split prism 25. Although the front end of The polarization split prism 25 is not shown, white light enters the liquid crystal panels 21a to 21c corresponding to three color light beams (G light, B light, R light) from the light source. Then, the light is optically modulated and is projected to a screen (not shown) by the projection zoom lens 29.

As described above, in the embodiment, for continuous power-varying of the projection zoom lens and correction of shift of an image surface caused by the continuous power-varying, the positive second lens group $G_2$, the positive third lens group $G_3$, the positive fourth lens group $G_4$, and the positive fifth lens group $G_5$ are moved with correlation, and the aperture diaphragm 3 is moved independently from the movement lens groups. Accordingly, it is possible to reduce a distance for zooming movement.

The projection zoom lens of the invention may be variously modified. For example, the number of lenses of each lens group, a radius of curvature of each lens, and a lens distance (or lens thickness) may be appropriately modified.

In addition, it is effective to use a lens of the invention as a projection zoom lens of a projection type display device using a reflection type liquid crystal display panel, but the invention is not limited to the use. The lens may be used as a projection zoom lens using the other optical modulation means such as a projection zoom lens of a device using a transmission type liquid crystal display panel and DMD.

EXAMPLES

Hereinafter, examples will be described in detail with reference to data.

Example 1

A projection zoom lens according to Example 1 has a configuration shown in FIG. 1 as described above. That is, in order from a magnification side of the lens, a first lens group $G_1$ includes a first lens $L_1$ of a positive meniscus lens having a convex surface on the magnification side, a second lens $L_2$ of a negative meniscus lens having a convex surface on the magnification side, a third lens $L_3$ of a negative meniscus lens having a convex surface on the magnification side, and a fourth lens $L_4$ of a biconcave lens; a second lens group $G_2$ includes a fifth lens $L_5$ of a positive meniscus lens having a convex surface on the reduction side, a sixth lens $L_6$ of a positive meniscus lens having a convex surface on the magnification side, a seventh lens $L_7$ of a negative meniscus lens having a convex surface on the magnification side; and a third lens group $G_3$ includes an eighth lens $L_8$ of a biconcave lens and a ninth lens $L_9$ of a plano-convex lens having a convex surface on the magnification side.

A fourth lens group $G_4$ includes only a tenth lens $L_{10}$ of a biconvex lens. A fifth lens group $G_5$ includes an eleventh lens $L_{11}$ of a negative meniscus lens having a convex surface on the magnification side, a twelfth lens $L_{12}$ of a negative meniscus lens having a concave surface on the magnification side, a thirteenth lens $L_{13}$ of a plano-convex lens having a convex surface on the reduction side, a fourteenth lens $L_{14}$ of a positive meniscus lens having a convex surface on the reduction side, and a fifteenth lens $L_{15}$ of a positive meniscus lens having a convex surface on the reduction side. Since the fifth lens group $G_5$ has such a configuration, it is possible to satisfactorily correct a longitudinal chromatic aberration. A sixth lens group $G_6$ includes a sixteenth lens $L_{16}$ formed of a biconvex lens.

An aperture diaphragm 3 is disposed between the fourth lens group $G_4$ and the fifth lens group $G_5$, and is moved independently from the lens groups during power-varying.

FIG. 2 shows movement positions of the lens groups at a wide angle end (WIDE), a middle position (MIDDLE), and a telephoto end (TELE), according to a power-varying operation, in the projection zoom lens of Example 1.

A radius of curvature R (standardized that a focal length of a conjugation point position infinity state on the magnification side at the wide angle end is 1.00; hereinafter, the same in the following tables) of each lens surface in Example 1, a center thickness of each lens, an air space D between lenses (standardized by the same focal length as the radius of curvature R; hereinafter, the same in the following tables), a refractive index N of each lens at the d-line, and an Abbe number ν are shown in Table 1. In Tables 1, 2, 3, 4, 5, and 6, numerals corresponding to signs R, D, N, and ν increase in order from the magnification side.

In addition, at the wide angle end (WIDE: zoom ratio 1.00), the middle position (MIDDLE: zoom ratio 1.255), and the telephoto end (TELE: zoom ratio 1.460), a distance $D_8$ (variable 1) between the first lens group $G_1$ and the second lens group $G_2$, a distance $D_{14}$ (variable 2) between the second lens group $G_2$ and the third lens group $G_3$, a distance $D_{18}$ (variable 3) between the third lens group $G_3$ and the fourth lens group $G_4$, a distance $D_{20}$ (variable 4) between the fourth lens group $G_4$ and the aperture 3, a distance $D_{21}$ (variable 5) between the aperture 3 and the fifth lens group $G_5$, and a distance $D_{31}$ (variable 6) between the fifth lens group $G_5$ and the sixth lens group $G_6$ are shown in the middle of Table 1.

TABLE 1

| Surface | | R | D | Nd | νd |
|---|---|---|---|---|---|
| 1 | | 3.9690 | 0.3403 | 1.77250 | 49.6 |
| 2 | | 23.0869 | 0.0084 | | |
| 3 | | 4.2759 | 0.1088 | 1.49700 | 81.6 |
| 4 | | 1.5970 | 0.4594 | | |
| 5 | | 49.5720 | 0.1004 | 1.49700 | 81.6 |
| 6 | | 2.0115 | 0.3775 | | |
| 7 | | −5.0098 | 0.0962 | 1.80518 | 25.4 |
| 8 | | 3.0802 | Variable 1 | | |
| 9 | | −6.1850 | 0.2501 | 1.80518 | 25.4 |
| 10 | | −2.8429 | 0.0084 | | |
| 11 | | 2.9169 | 0.1349 | 1.80610 | 40.9 |
| 12 | | 5.0736 | 0.0209 | | |
| 13 | | 2.5806 | 0.0837 | 1.51633 | 64.1 |
| 14 | | 1.8348 | Variable 2 | | |
| 15 | | −23.0837 | 0.0732 | 1.49700 | 81.6 |
| 16 | | 4.4488 | 0.0210 | | |
| 17 | | 2.8273 | 0.1838 | 1.56384 | 60.7 |
| 18 | | ∞ | Variable 3 | | |
| 19 | | 4.5106 | 0.2459 | 1.49700 | 81.6 |
| 20 | | −4.5106 | Variable 4 | | |
| 21 | Aperture diaphragm | ∞ | Variable 5 | | |
| 22 | | 1.6316 | 0.0586 | 1.51633 | 64.1 |
| 23 | | 1.2957 | 0.3607 | | |
| 24 | | −1.0008 | 0.0690 | 1.83481 | 42.7 |
| 25 | | −50.9456 | 0.0383 | | |
| 26 | | ∞ | 0.2100 | 1.49700 | 81.6 |
| 27 | | −1.5358 | 0.0071 | | |
| 28 | | −6.9341 | 0.2544 | 1.49700 | 81.6 |
| 29 | | −1.4451 | 0.0071 | | |
| 30 | | −12.4824 | 0.1862 | 1.49700 | 81.6 |
| 31 | | −2.1616 | Variable 6 | | |
| 32 | | 2.7990 | 0.2099 | 1.49700 | 81.6 |
| 33 | | −14.6746 | 0.5841 | | |
| 34 | | ∞ | 2.8200 | 1.68893 | 31.1 |
| 35 | | ∞ | | | |

TABLE 1-continued

| Zoom Ratio | Variable 1 | Variable 2 | Variable 3 | Variable 4 | Variable 5 | Variable 6 |
|---|---|---|---|---|---|---|
| 1.000 (WIDE) | 1.0995 | 0.7216 | 2.4685 | 0.1450 | 0.9170 | 0.0620 |
| 1.255 (MIDDLE) | 0.8286 | 0.4373 | 1.8915 | 1.1497 | 0.6119 | 0.4944 |
| 1.460 (TELE) | 0.6929 | 0.5656 | 1.0971 | 1.8602 | 0.2877 | 0.9099 |
| Conditional Expression (1) | 2.253 | | Conditional Expression (2) | 1.406 | Conditional Expression (3) | 4.579 |
| Conditional Expression (4) | 1.140 (W) −1.199 (T) | | Conditional Expression (5) | 81.6 | Conditional Expression (6) | 42.7 |
| Conditional Expression (7) | 1.835 | | Conditional Expression (8) | 81.6 | | |

Values (value corresponding to the conditional expression (7) is rounded off to four decimal places) corresponding to the conditional expressions (1) to (8) in Example 1 are shown in the lower part of Table 1.

Figure 13:
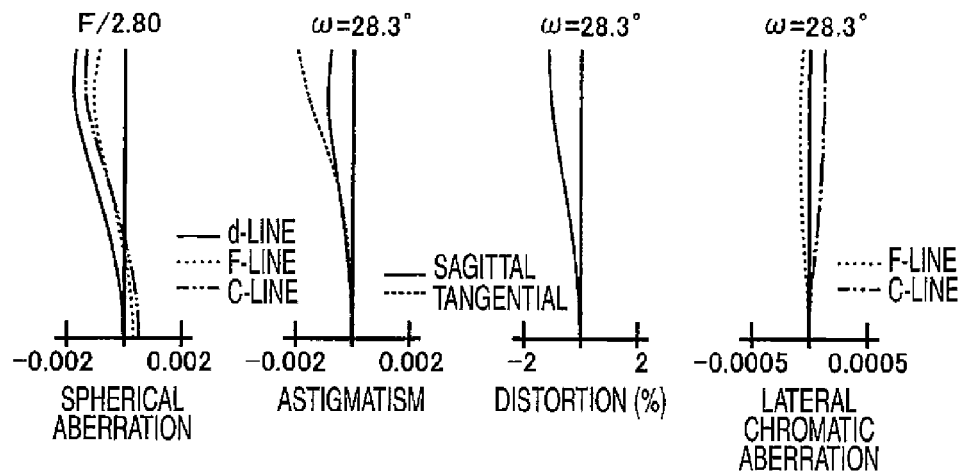
FIG. 13 is aberration diagrams of the projection zoom lens according to Example 1.
Figure 13:
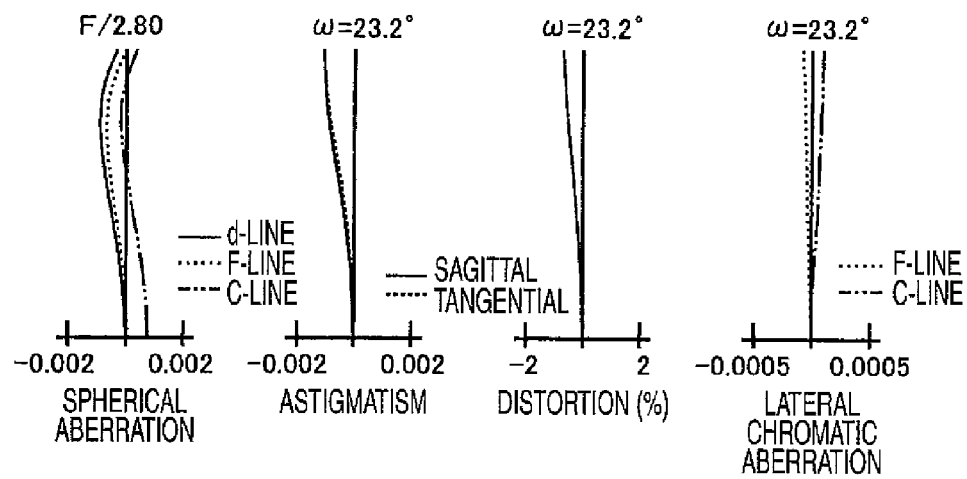
Figure 13:
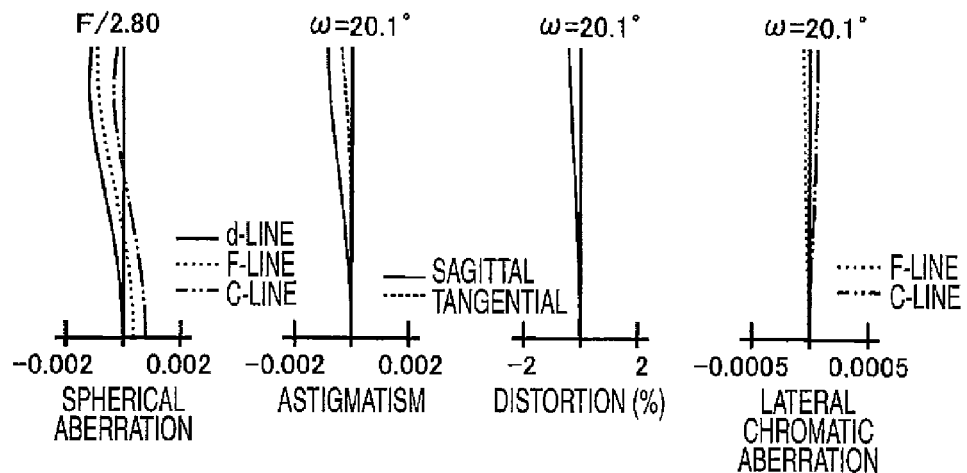

FIG. 13 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 1. In FIG. 13, and FIGS. 14 to 18, the spherical aberration diagrams represent aberration curves at the the d-line, F-line, and C-line. In the figures, aberrations with respect to a sagittal image surface and a tangential image surface are shown in the astigmatism diagrams, and aberrations at the the F-line and C-line with respect to the d-line are shown in the lateral chromatic aberrations diagrams.

As shown in the spherical aberration diagrams of FIG. 13, Fno is constant as 2.80 at the wide angle end (WIDE), the middle position (MIDDLE), and the telephoto end (TELE).

Figure 11:
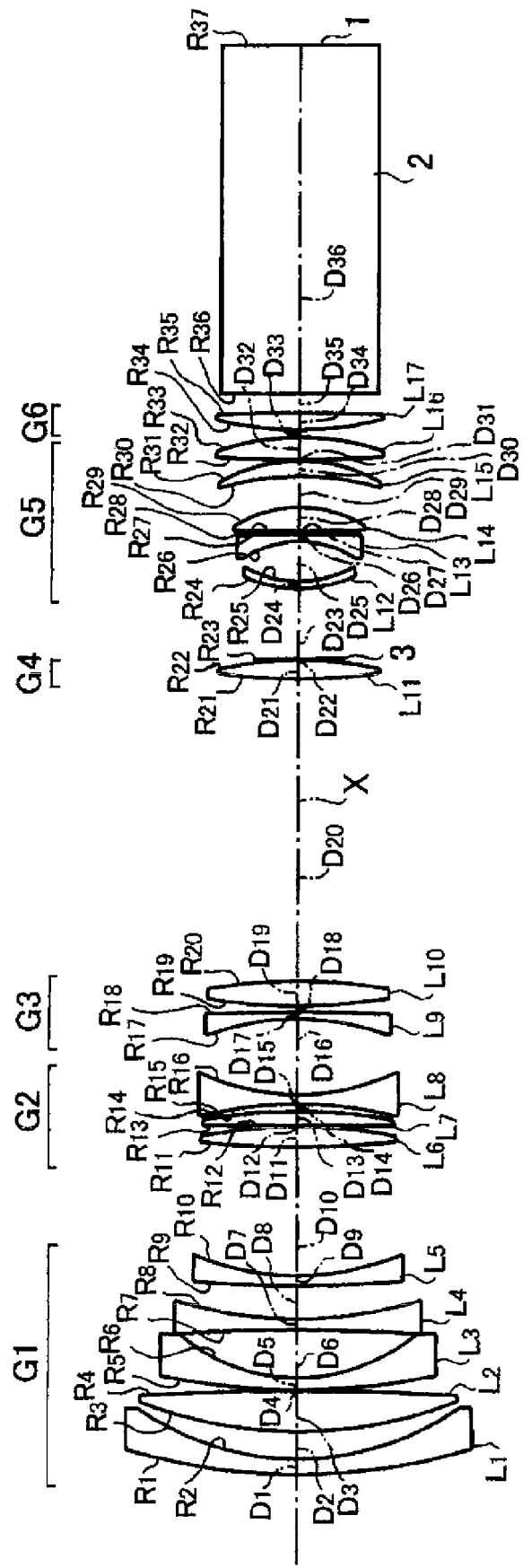
FIG. 11 is a diagram illustrating a projection zoom lens according to Example 6.

As can be seen from FIG. 11 and Table 1, aberrations are satisfactorily corrected in the whole zoom region by the projection zoom lens of Example 1. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.460. Accordingly, a range of projection distance capable of coping is wide.

Example 2

Figure 3:
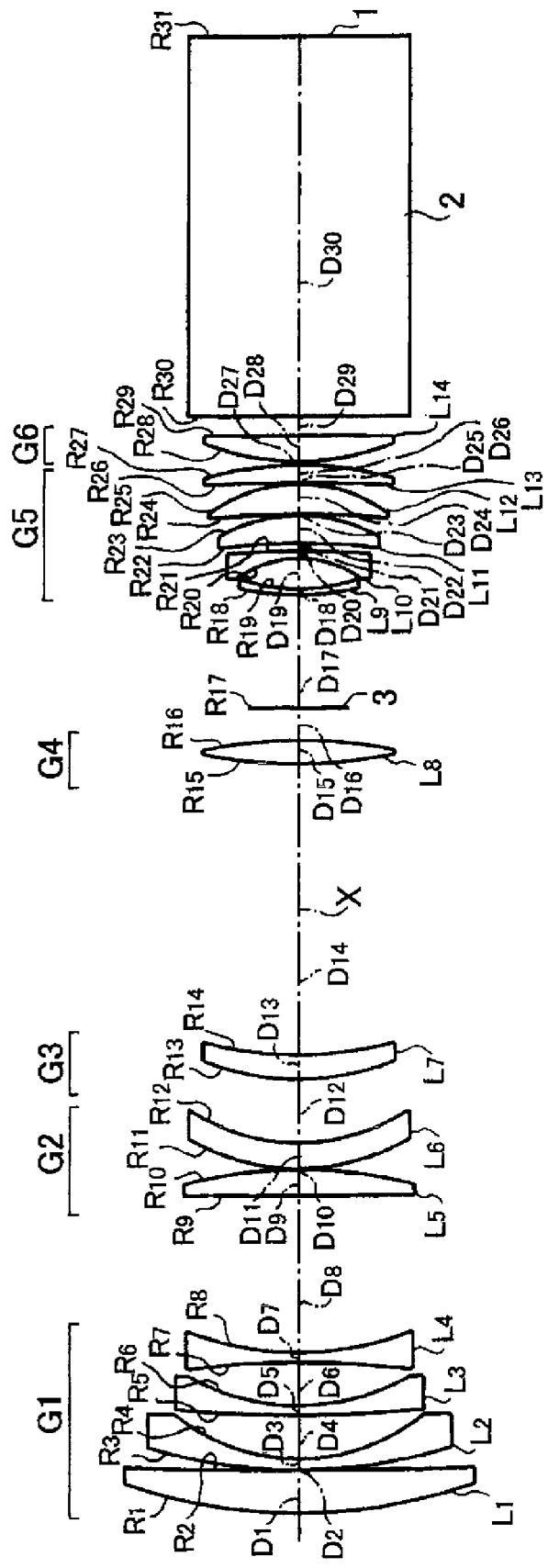
FIG. 3 is a diagram illustrating a projection zoom lens according to Example 2.

A projection zoom lens according to Example 2 has a configuration as shown in FIG. 3. The projection zoom lens basically has a configuration similar to that of Example 1, but is different in that the second lens group $G_2$ includes a fifth lens $L_5$ of a positive lens having a convex surface on the magnification side and a sixth lens $L_6$ of a negative meniscus lens having a convex surface on the magnification side, the third lens group $G_3$ includes only a seventh lens $L_7$ of a positive meniscus lens having a convex surface on the magnification side, and a third lens of the fifth lens group $G_5$ from the reduction side is an eleventh lens $L_{11}$ of a positive meniscus lens having a convex surface on the reduction side.

Figure 4:
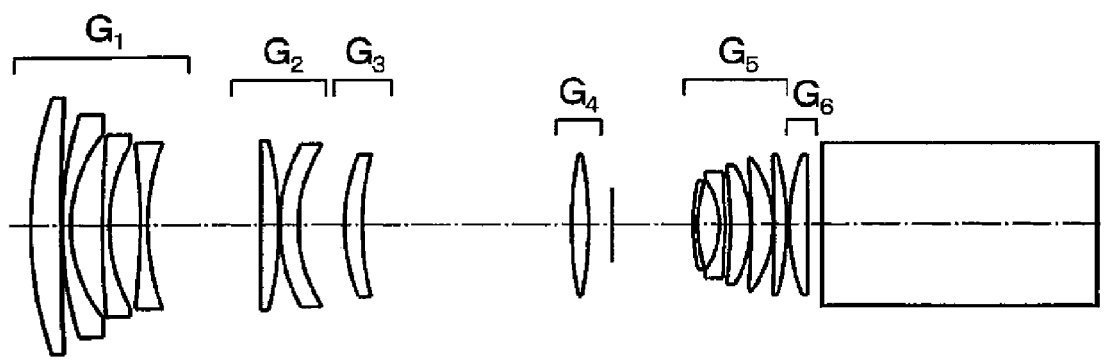
FIG. 4 is a diagram illustrating movement positions of lens groups at a wide angle end (WIDE), a middle position (MIDDLE), and a telephoto end (TELE) of the zoom lens according to Example 2.
Figure 4:
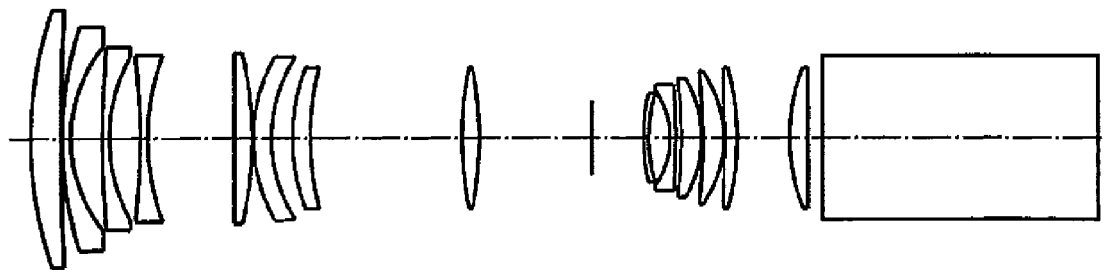
Figure 4:
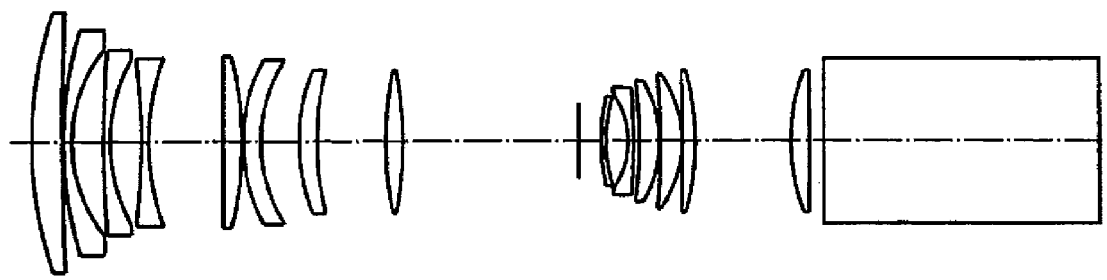

FIG. 4 shows movement positions of the lens groups at a wide angle end (WIDE), a middle position (MIDDLE), and a telephoto end (TELE), according to a power-varying operation, in the projection zoom lens of Example 2.

A radius of curvature R of each lens surface in Example 2, a center thickness of each lens, an air space D between lenses, a refractive index N of each lens at the d-line, and an Abbe number ν are shown in Table 2.

In addition, at the wide angle end (WIDE: zoom ratio 1.00), the middle position (MIDDLE: zoom ratio 1.306), and the telephoto end (TELE: zoom ratio 1.560), a distance $D_8$ (variable 1) between the first lens group $G_1$ and the second lens group $G_2$, a distance $D_{12}$ (variable 2) between the second lens group $G_2$ and the third lens group $G_3$, a distance $D_{14}$ (variable 3) between the third lens group $G_3$ and the fourth lens group $G_4$, a distance $D_{16}$ (variable 4) between the fourth lens group $G_4$ and the aperture 3, a distance $D_{17}$ (variable 5) between the aperture 3 and the fifth lens group $G_5$, and a distance $D_{27}$ (variable 6) between the fifth lens group $G_5$ and the sixth lens group $G_6$ are shown in the middle of Table 2.

TABLE 2

| Surface | R | D | Nd | νd |
|---|---|---|---|---|
| 1 | 4.3521 | 0.3376 | 1.78590 | 44.2 |
| 2 | 35.3835 | 0.0078 | | |
| 3 | 4.2472 | 0.0870 | 1.49700 | 81.6 |
| 4 | 1.6130 | 0.3484 | | |
| 5 | 11.8557 | 0.0744 | 1.49700 | 81.6 |
| 6 | 1.8396 | 0.3455 | | |
| 7 | −7.2053 | 0.0792 | 1.80518 | 25.4 |
| 8 | 2.5678 | Variable 1 | | |
| 9 | 199.9106 | 0.2079 | 1.80518 | 25.4 |
| 10 | −3.7034 | 0.0078 | | |
| 11 | 1.8130 | 0.2025 | 1.80518 | 25.4 |
| 12 | 1.6241 | Variable 2 | | |
| 13 | 2.1053 | 0.1949 | 1.49700 | 81.6 |
| 14 | 3.0360 | Variable 3 | | |
| 15 | 3.8653 | 0.1900 | 1.49700 | 81.6 |

TABLE 2-continued

| | | | | | |
|---|---|---|---|---|---|
| 16 | | −3.9772 | Variable 4 | | |
| 17 | Aperture diaphragm | ∞ | Variable 5 | | |
| 18 | | 2.2493 | 0.0496 | 1.56732 | 42.8 |
| 19 | | 1.5340 | 0.2461 | | |
| 20 | | −0.8833 | 0.0590 | 1.83481 | 42.7 |
| 21 | | −8.3698 | 0.0638 | | |
| 22 | | −5.1457 | 0.2247 | 1.49700 | 81.6 |
| 23 | | −1.3069 | 0.0086 | | |
| 24 | | −7.8858 | 0.2422 | 1.49700 | 81.6 |
| 25 | | −1.2382 | 0.0078 | | |
| 26 | | −19.4916 | 0.1406 | 1.49700 | 81.6 |
| 27 | | −2.9013 | Variable 6 | | |
| 28 | | 2.1434 | 0.2048 | 1.49700 | 81.6 |
| 29 | | −62.4168 | 0.5453 | | |
| 30 | | ∞ | 2.6300 | 1.68893 | 31.1 |
| 31 | | ∞ | | | |

| Zoom Ratio | Variable 1 | Variable 2 | Variable 3 | Variable 4 | Variable 5 | Variable 6 |
|---|---|---|---|---|---|---|
| 1.000 (WIDE) | 1.2507 | 0.5101 | 2.3292 | 0.2576 | 0.9039 | 0.0292 |
| 1.306 (MIDDLE) | 0.9562 | 0.2344 | 1.6799 | 1.2553 | 0.5777 | 0.5773 |
| 1.560 (TELE) | 0.8283 | 0.4273 | 0.7639 | 1.9552 | 0.2513 | 1.0548 |

| | | | | | |
|---|---|---|---|---|---|
| Conditional Expression (1) | 2.101 | Conditional Expression (2) | 2.102 | Conditional Expression (3) | 3.976 |
| Conditional Expression (4) | 1.116 (W) −1.177 (T) | Conditional Expression (5) | 81.6 | Conditional Expression (6) | 42.7 |
| Conditional Expression (7) | 1.835 | Conditional Expression (8) | 81.6 | | |

Values corresponding to the conditional expressions (1) to (8) in Example 2 are shown in the lower part of Table 2.

Figure 14:
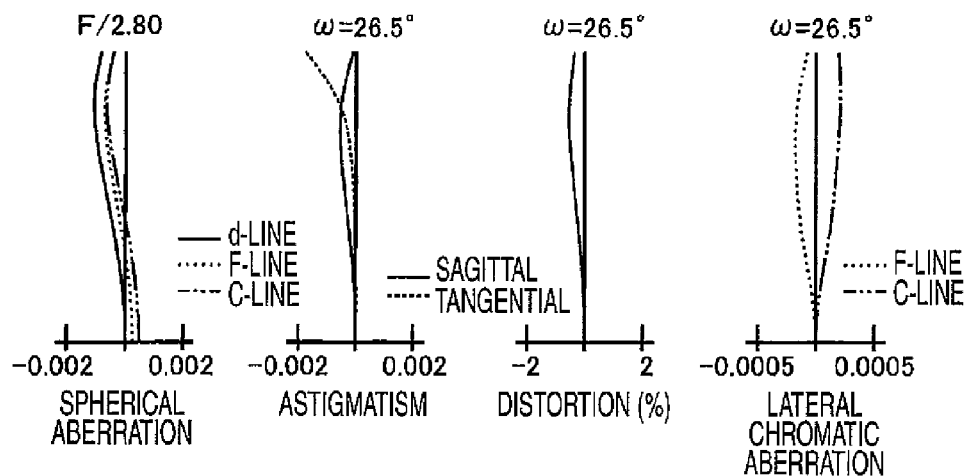
FIG. 14 is aberration diagrams of the projection zoom lens according to Example 2.
Figure 14:
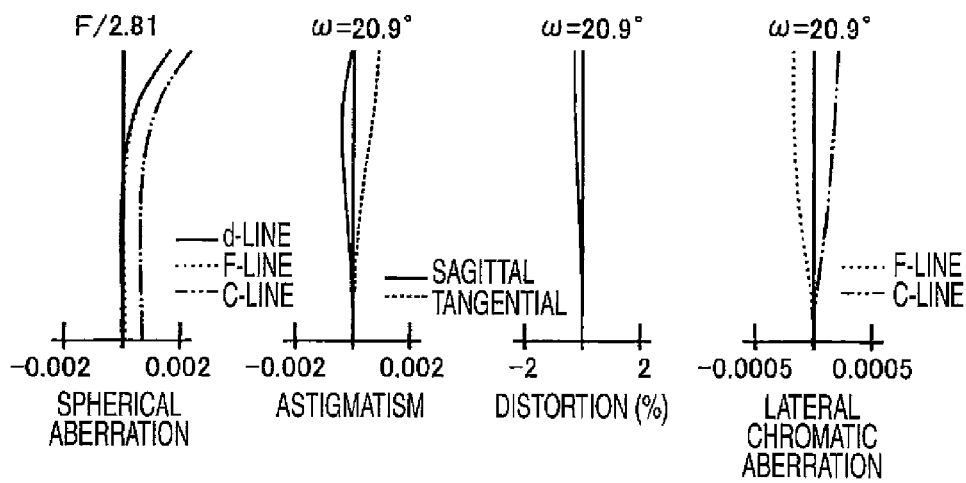
Figure 14:
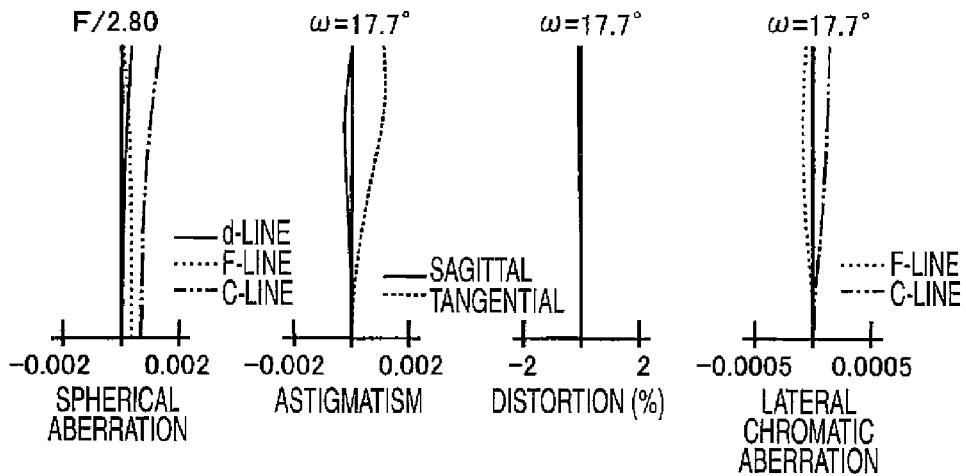

FIG. 14 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 2.

As shown in the spherical aberration diagrams of FIG. 14, Fno is constant as 2.80 to 2.81 at the wide angle end (WIDE), the middle position (MIDDLE), and the telephoto end (TELE).

As can be seen from FIG. 14 and Table 2, aberrations are satisfactorily corrected in the whole zoom region by the projection zoom lens of Example 2. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.560. Accordingly, a range of projection distance capable of coping is wide.

Example 3

Figure 5:
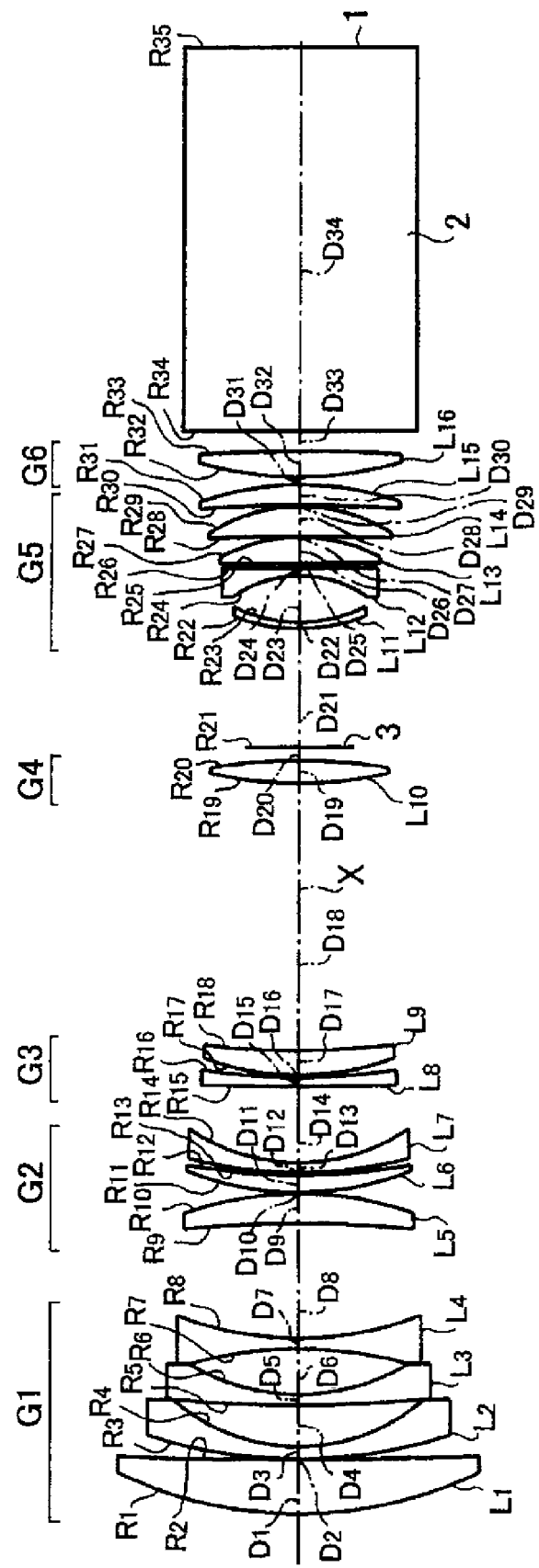
FIG. 5 is a diagram illustrating a projection zoom lens according to Example 3.

A projection zoom lens according to Example 3 has a configuration as shown in FIG. 5. The projection zoom lens basically has a configuration similar to that of Example 1, but is different in that the eighth lens $L_8$ is a negative meniscus lens having a convex surface on the magnification side, the ninth lens $L_9$ is a positive meniscus lens having a convex surface on the magnification side, and the twelfth lens $L_{12}$ is a plano-concave lens having a concave surface on the magnification side.

Figure 6:
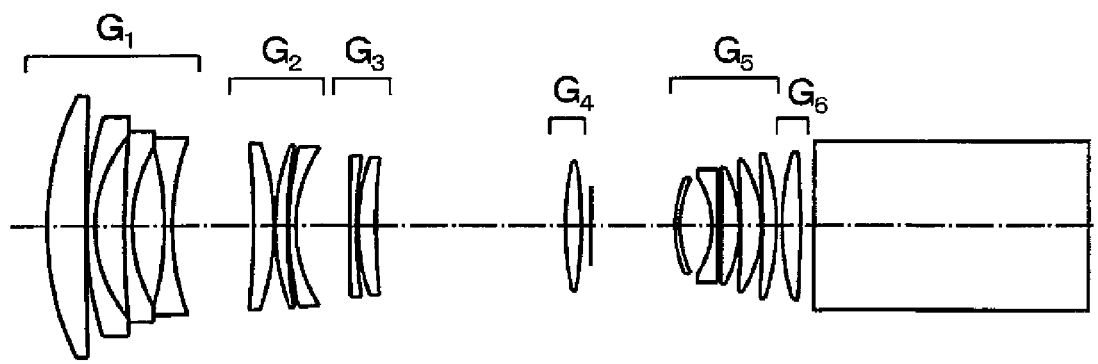
FIG. 6 is a diagram illustrating movement positions of lens groups at a wide angle end (WIDE), a middle position (MIDDLE), and a telephoto end (TELE) of the zoom lens according to Example 3.
Figure 6:
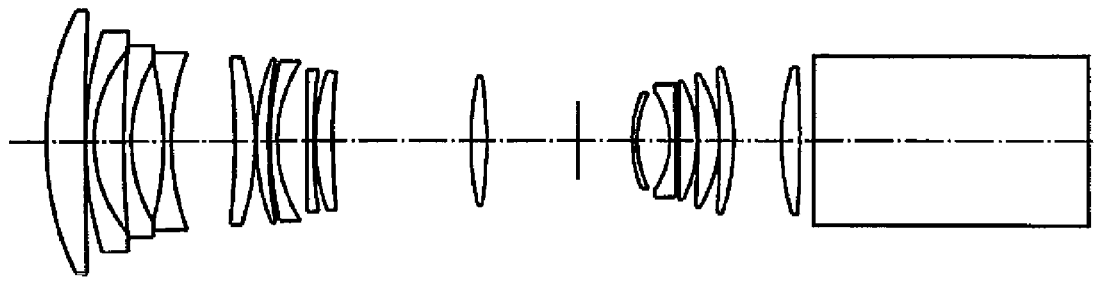
Figure 6:
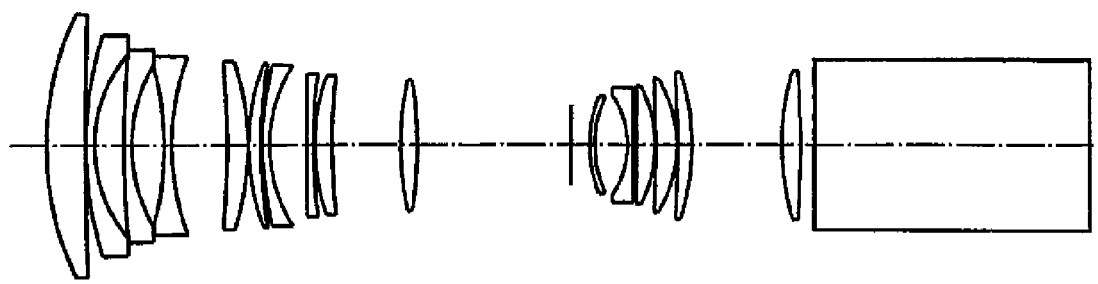

FIG. 6 shows movement positions of the lens groups at a wide angle end (WIDE), a middle position (MIDDLE), and a telephoto end (TELE), according to a power-varying operation, in the projection zoom lens of Example 3.

A radius of curvature R of each lens surface in Example 3, a center thickness of each lens, an air space D between lenses, a refractive index N of each lens at the d-line, and an Abbe number ν are shown in Table 3.

In addition, at the wide angle end (WIDE: zoom ratio 1.00), the middle position (MIDDLE: zoom ratio 1.275), and the telephoto end (TELE: zoom ratio 1.520), a distance $D_8$ (variable 1) between the first lens group $G_1$ and the second lens group $G_2$, a distance $D_{14}$ (variable 2) between the second lens group $G_2$ and the third lens group $G_3$, a distance $D_{18}$ (variable 3) between the third lens group $G_3$ and the fourth lens group $G_4$, a distance $D_{20}$ (variable 4) between the fourth lens group $G_4$ and the aperture 3, a distance $D_{21}$ (variable 5) between the aperture 3 and the fifth lens group $G_5$, and a distance $D_{31}$ (variable 6) between the fifth lens group $G_5$ and the sixth lens group $G_6$ are shown in the middle of Table 3.

TABLE 3

| Surface | R | D | Nd | νd |
|---|---|---|---|---|
| 1 | 3.2457 | 0.4085 | 1.77250 | 49.6 |
| 2 | 35.8238 | 0.0075 | | |
| 3 | 3.7875 | 0.0941 | 1.49700 | 81.6 |
| 4 | 1.4961 | 0.3128 | | |
| 5 | 10.5671 | 0.0828 | 1.49700 | 81.6 |
| 6 | 1.6516 | 0.3479 | | |

TABLE 3-continued

| | | | | |
|---|---|---|---|---|
| 7 | | −3.1839 | 0.0810 | 1.80518 | 25.4 |
| 8 | | 2.6568 | Variable 1 | | |
| 9 | | −8.7583 | 0.2225 | 1.80518 | 25.4 |
| 10 | | −2.7407 | 0.0075 | | |
| 11 | | 2.3387 | 0.1330 | 1.80610 | 40.9 |
| 12 | | 4.9239 | 0.0188 | | |
| 13 | | 3.4548 | 0.0753 | 1.48749 | 70.2 |
| 14 | | 1.5371 | Variable 2 | | |
| 15 | | 35.8921 | 0.0659 | 1.49700 | 81.6 |
| 16 | | 4.8265 | 0.0188 | | |
| 17 | | 2.1126 | 0.1892 | 1.51633 | 64.1 |
| 18 | | 6.5144 | Variable 3 | | |
| 19 | | 3.2077 | 0.1727 | 1.49700 | 81.6 |
| 20 | | −4.4031 | Variable 4 | | |
| 21 | Aperture diaphragm | ∞ | Variable 5 | | |
| 22 | | 1.4009 | 0.0490 | 1.48749 | 70.2 |
| 23 | | 1.1408 | 0.3553 | | |
| 24 | | −0.9188 | 0.0565 | 1.83481 | 42.7 |
| 25 | | ∞ | 0.0375 | | |
| 26 | | ∞ | 0.2004 | 1.49700 | 81.6 |
| 27 | | −1.3331 | 0.0057 | | |
| 28 | | −14.3988 | 0.2313 | 1.49700 | 81.6 |
| 29 | | −1.3143 | 0.0066 | | |
| 30 | | −11.5356 | 0.1554 | 1.49700 | 81.6 |
| 31 | | −2.4235 | Variable 6 | | |
| 32 | | 2.7489 | 0.1966 | 1.49700 | 81.6 |
| 33 | | −12.6248 | 0.5287 | | |
| 34 | | ∞ | 2.5400 | 1.68893 | 31.1 |
| 35 | | ∞ | | | |

| Zoom Ratio | Variable 1 | Variable 2 | Variable 3 | Variable 4 | Variable 5 | Variable 6 |
|---|---|---|---|---|---|---|
| 1.000 (WIDE) | 0.8710 | 0.5793 | 2.0411 | 0.1007 | 0.9073 | 0.0557 |
| 1.275 (MIDDLE) | 0.6774 | 0.3225 | 1.4831 | 0.9813 | 0.5807 | 0.5101 |
| 1.520 (TELE) | 0.5923 | 0.4021 | 0.7313 | 1.6632 | 0.1964 | 0.9699 |

| | | | | | |
|---|---|---|---|---|---|
| Conditional Expression (1) | 2.032 | Conditional Expression (2) | 1.282 | Conditional Expression (3) | 3.761 |
| Conditional Expression (4) | 1.188 (W) −1.265 (T) | Conditional Expression (5) | 81.6 | Conditional Expression (6) | 42.7 |
| Conditional Expression (7) | 1.835 | Conditional Expression (8) | 81.6 | | |

Values corresponding to the conditional expressions (1) to (8) in Example 3 are shown in the lower part of Table 3.

Figure 15:
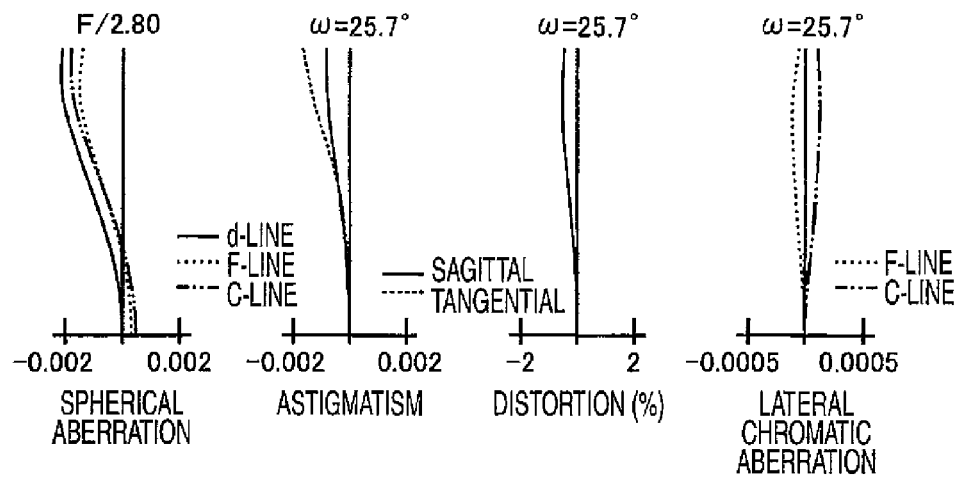
FIG. 15 is aberration diagrams of the projection zoom lens according to Example 3.
Figure 15:
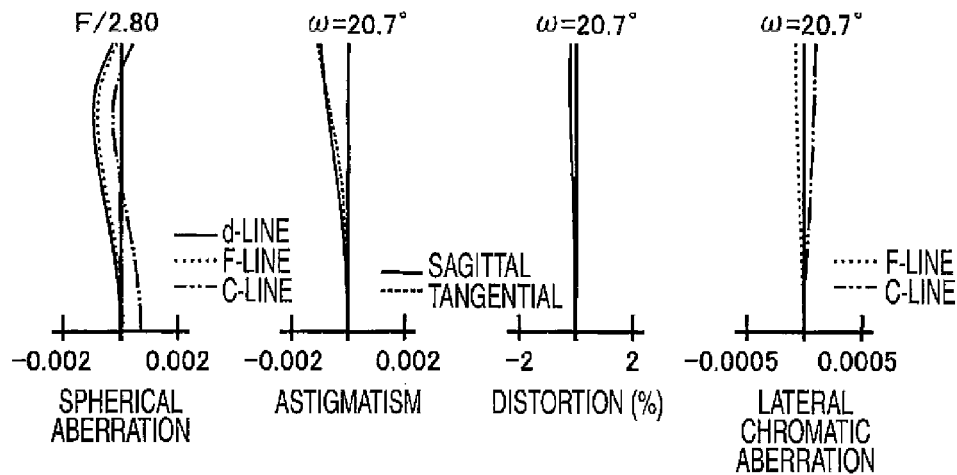
Figure 15:
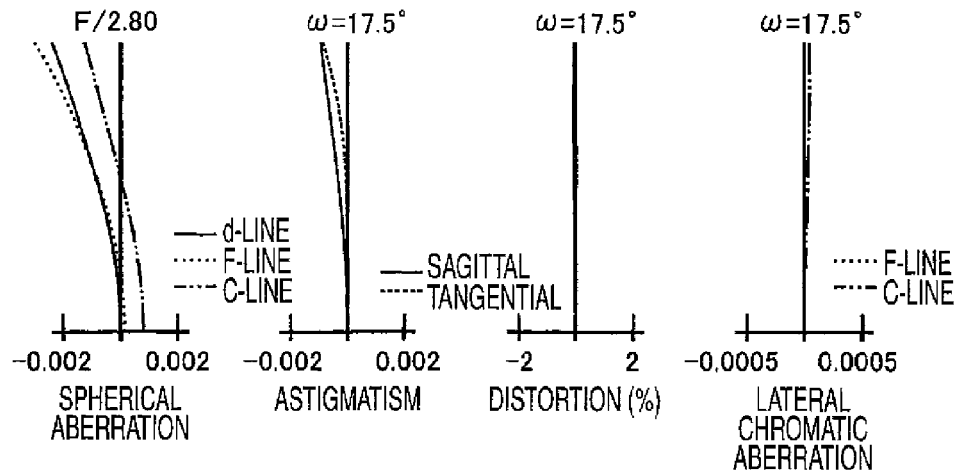

FIG. 15 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 3.

As shown in the spherical aberration diagrams of FIG. 15, Fno is constant as 2.80 at the wide angle end (WIDE), the middle position (MIDDLE), and the telephoto end (TELE).

As can be seen from FIG. 15 and Table 3, aberrations are satisfactorily corrected in the whole zoom region by the projection zoom lens of Example 3. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.520. Accordingly, a range of projection distance capable of coping is wide.

Example 4

Figure 7:
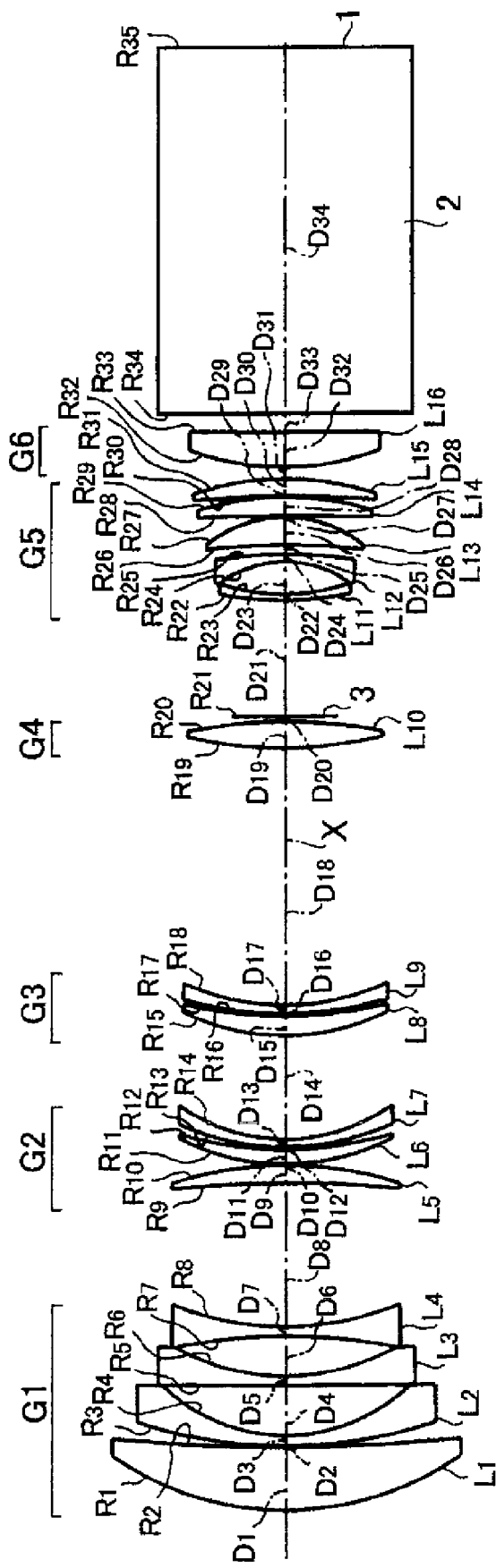
FIG. 7 is a diagram illustrating a projection zoom lens according to Example 4.

A projection zoom lens according to Example 4 has a configuration as shown in FIG. 7. The projection zoom lens basically has a configuration similar to that of Example 3, but is different in that the twelfth lens $L_{12}$ is a negative meniscus lens having a convex surface on the reduction side.

Figure 8:
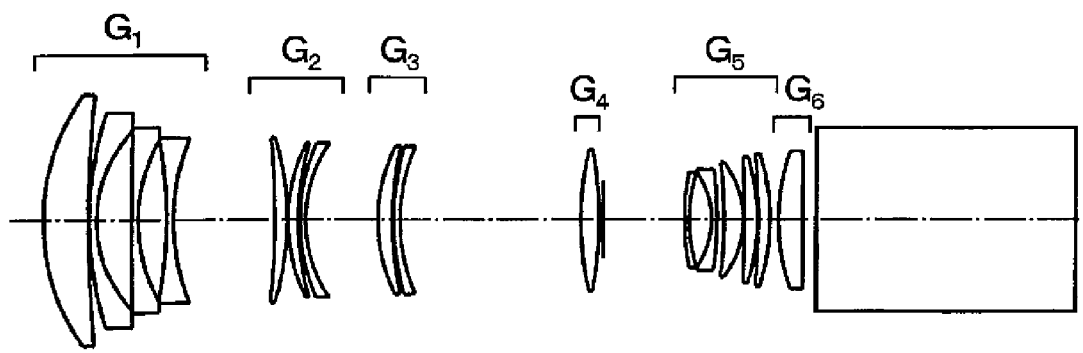
FIG. 8 is a diagram illustrating movement positions of lens groups at a wide angle end (WIDE), a middle position (MIDDLE), and a telephoto end (TELE) of the zoom lens according to Example 4.
Figure 8:
Figure 8:
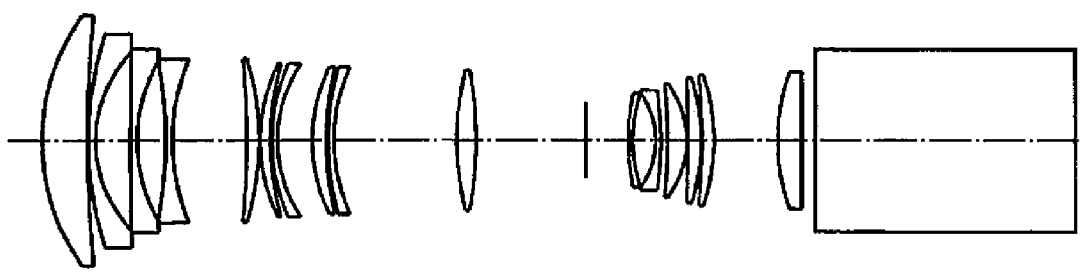
Figure 8:
Figure 8:
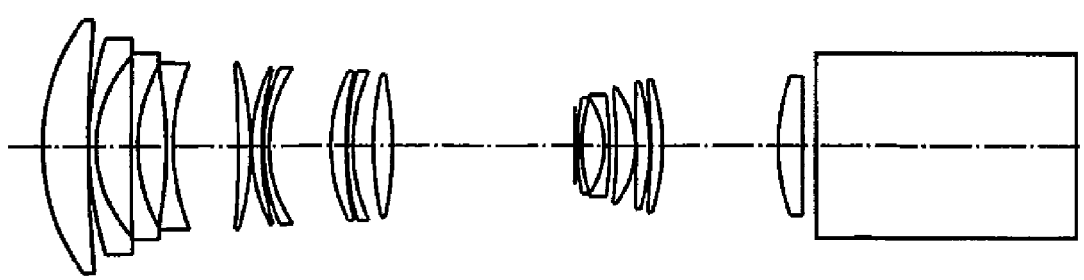

FIG. 8 shows movement positions of the lens groups at a wide angle end (WIDE), a middle position (MIDDLE), and a telephoto end (TELE), according to a power-varying operation, in the projection zoom lens of Example 4.

A radius of curvature R of each lens surface in Example 4, a center thickness of each lens, an air space D between lenses, a refractive index N of each lens at the d-line, and an Abbe number ν are shown in Table 4.

In addition, at the wide angle end (WIDE: zoom ratio 1.00), the middle position (MIDDLE: zoom ratio 1.383), and the telephoto end (TELE: zoom ratio 1.717), a distance $D_8$ (variable 1) between the first lens group $G_1$ and the second lens group $G_2$, a distance $D_{14}$ (variable 2) between the second lens group $G_2$ and the third lens group $G_3$, a distance $D_{18}$ (variable 3) between the third lens group $G_3$ and the fourth lens group $G_4$, a distance $D_{20}$ (variable 4) between the fourth lens group $G_4$ and the aperture 3, a distance $D_{21}$ (variable 5) between the aperture 3 and the fifth lens group $G_5$, and a distance $D_{31}$ (variable 6) between the fifth lens group $G_5$ and the sixth lens group $G_6$ are shown in the middle of Table 4.

TABLE 4

| Surface | R | D | Nd | vd |
|---|---|---|---|---|
| 1 | 2.1716 | 0.4409 | 1.77250 | 49.6 |
| 2 | 12.5833 | 0.0066 | | |
| 3 | 3.4033 | 0.0736 | 1.49700 | 81.6 |
| 4 | 1.2704 | 0.3472 | | |
| 5 | 60.4254 | 0.0629 | 1.49700 | 81.6 |
| 6 | 1.5843 | 0.2826 | | |
| 7 | −4.2396 | 0.0669 | 1.80518 | 25.4 |
| 8 | 2.1067 | Variable 1 | | |
| 9 | −8.8436 | 0.1253 | 1.80518 | 25.4 |
| 10 | −2.7059 | 0.0066 | | |
| 11 | 1.6713 | 0.1029 | 1.80518 | 25.4 |
| 12 | 2.7074 | 0.0165 | | |
| 13 | 1.8428 | 0.0542 | 1.80518 | 25.4 |
| 14 | 1.3266 | Variable 2 | | |
| 15 | 1.6274 | 0.1421 | 1.49700 | 81.6 |
| 16 | 3.1740 | 0.0165 | | |
| 17 | 2.6253 | 0.0577 | 1.48749 | 70.2 |
| 18 | 1.7413 | Variable 3 | | |
| 19 | 2.9865 | 0.1876 | 1.49700 | 81.6 |
| 20 | −3.5880 | Variable 4 | | |
| 21 | Aperture diaphragm | ∞ | Variable 5 | | |
| 22 | 2.3421 | 0.0419 | 1.51742 | 52.4 |
| 23 | 1.3965 | 0.2295 | | |
| 24 | −0.7943 | 0.0499 | 1.83481 | 42.7 |
| 25 | −3.8103 | 0.0683 | | |
| 26 | −4.9196 | 0.1933 | 1.49700 | 81.6 |
| 27 | −0.9860 | 0.0066 | | |
| 28 | −26.4813 | 0.1338 | 1.49700 | 81.6 |
| 29 | −2.0874 | 0.0066 | | |
| 30 | −7.2464 | 0.1207 | 1.49700 | 81.6 |
| 31 | −2.0685 | Variable 6 | | |
| 32 | 1.9455 | 0.2445 | 1.49700 | 81.6 |
| 33 | ∞ | 0.4603 | | |
| 34 | ∞ | 2.2200 | 1.68893 | 31.1 |
| 35 | ∞ | | | |

| Zoom Ratio | Variable 1 | Variable 2 | Variable 3 | Variable 4 | Variable 5 | Variable 6 |
|---|---|---|---|---|---|---|
| 1.000 (WIDE) | 0.9992 | 0.7220 | 1.7950 | 0.0329 | 0.8184 | 0.0794 |
| 1.383 (MIDDLE) | 0.7303 | 0.3486 | 1.2273 | 1.0787 | 0.4319 | 0.6301 |
| 1.717 (TELE) | 0.6422 | 0.6209 | 0.2058 | 1.8065 | 0.0248 | 1.1467 |

| | | | | | | |
|---|---|---|---|---|---|---|
| Conditional Expression (1) | 1.774 | | Conditional Expression (2) | 1.172 | Conditional Expression (3) | 3.310 |
| Conditional Expression (4) | 1.269 (W) −1.358 (T) | | Conditional Expression (5) | 81.6 | Conditional Expression (6) | 42.7 |
| Conditional Expression (7) | 1.835 | | Conditional Expression (8) | 81.6 | | |

Values corresponding to the conditional expressions (1) to (8) in Example 4 are shown in the lower part of Table 4.

Figure 16:
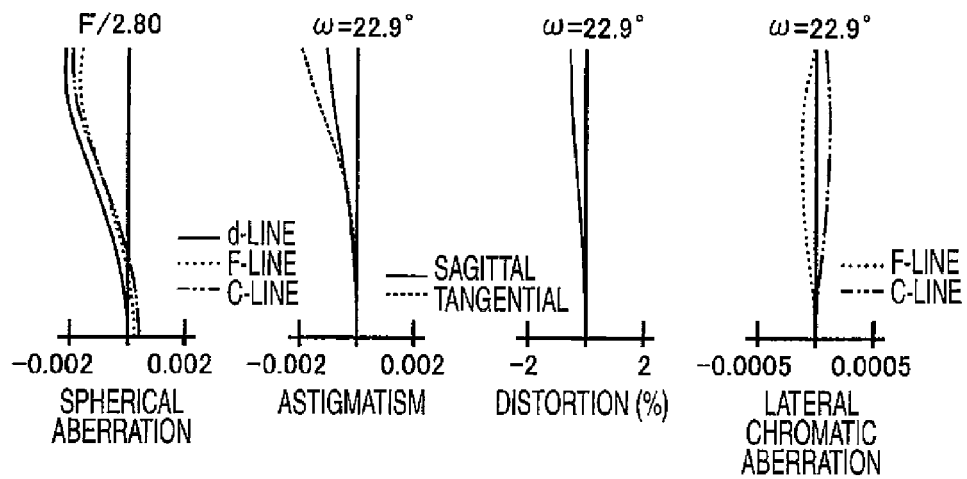
FIG. 16 is aberration diagrams of the projection zoom lens according to Example 4.
Figure 16:
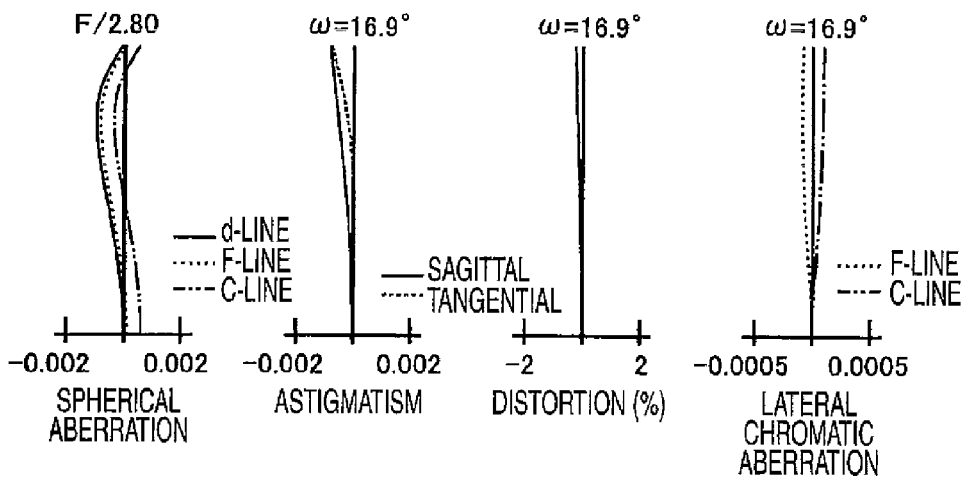
Figure 16:
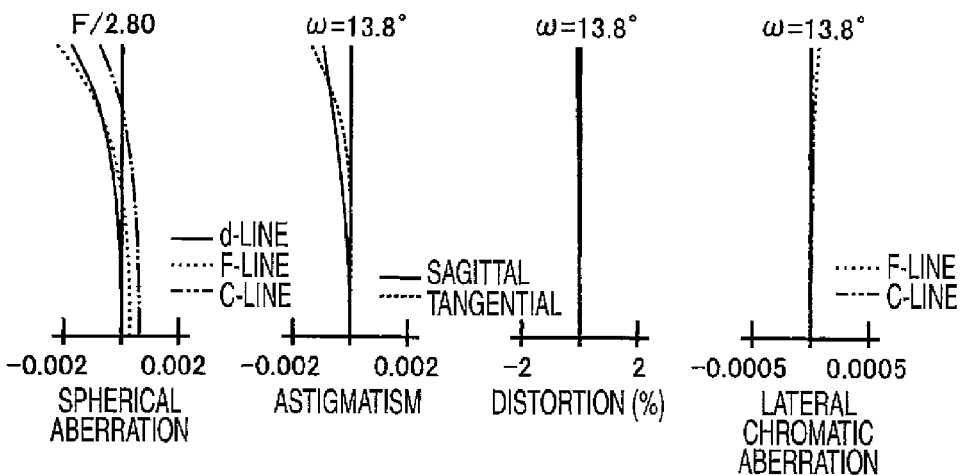

FIG. 16 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 4.

As shown in the spherical aberration diagrams of FIG. 16, Fno is constant as 2.80 at the wide angle end (WIDE), the middle position (MIDDLE), and the telephoto end (TELE).

As can be seen from FIG. 16 and Table 4, aberrations are satisfactorily corrected in the whole zoom region by the projection zoom lens of Example 4. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.717. Accordingly, a range of projection distance capable of coping is wide.

Example 5

Figure 9:
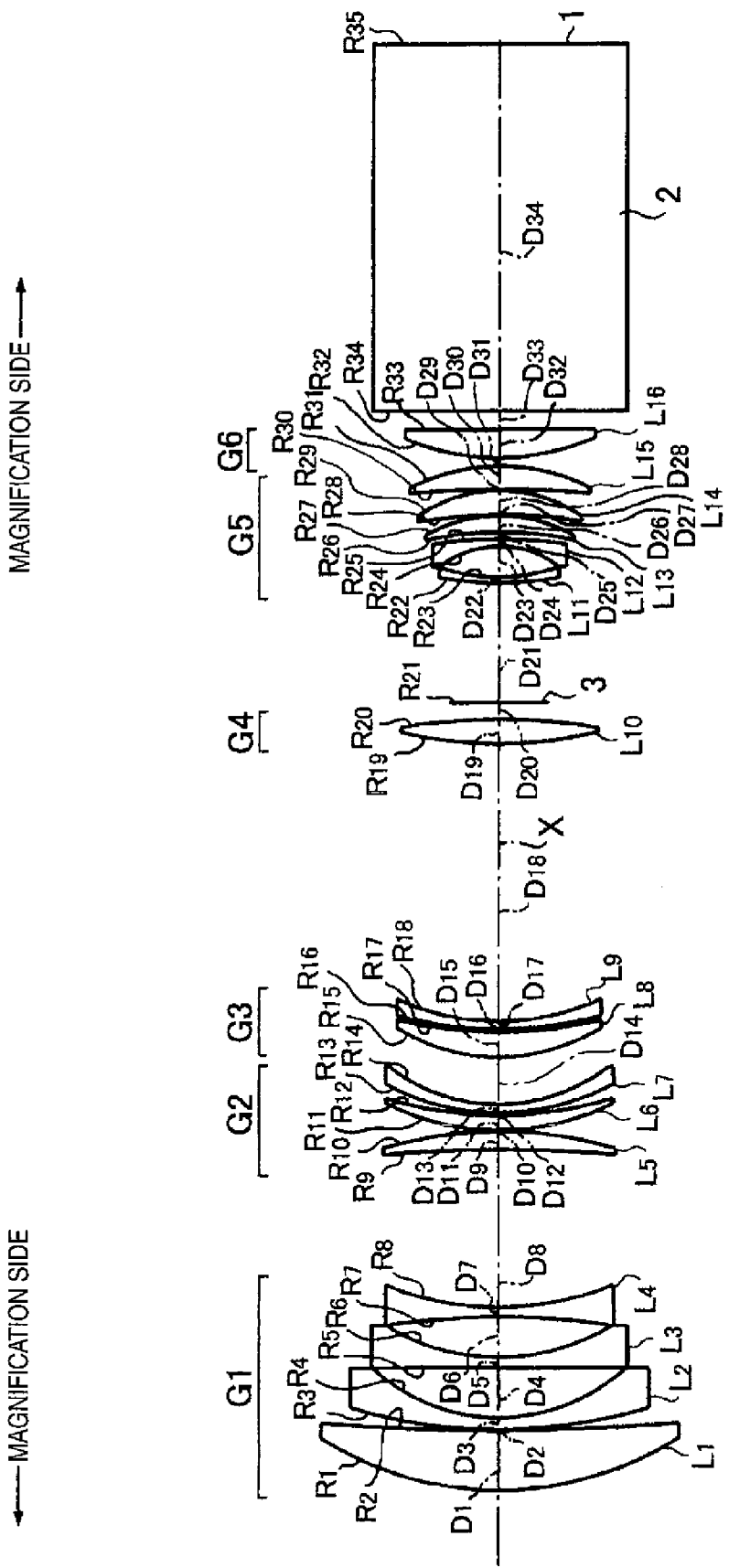
FIG. 9 is a diagram illustrating a projection zoom lens according to Example 5.

A projection zoom lens according to Example 5 has a configuration as shown in FIG. 9. The projection zoom lens basically has a configuration similar to that of Example 4, but is different in that the third lens $L_3$ is a plano-concave lens having a concave surface on the reduction side.

Figure 10:
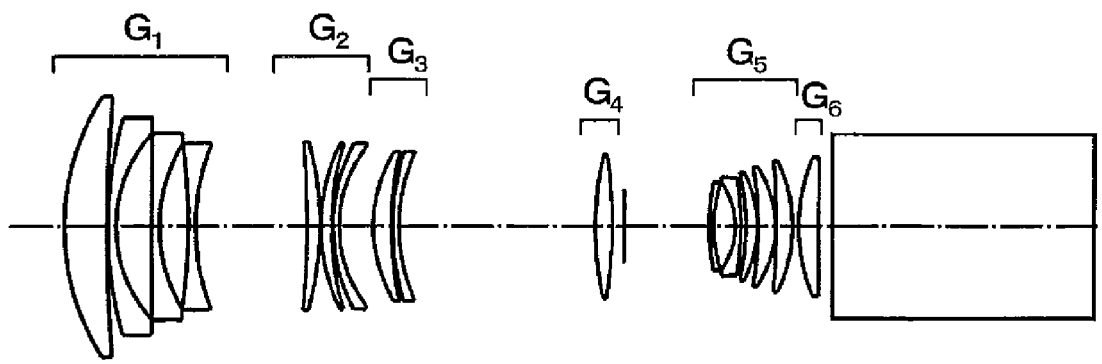
FIG. 10 is a diagram illustrating movement positions of lens groups at a wide angle end (WIDE), a middle position (MIDDLE), and a telephoto end (TELE) of the zoom lens according to Example 5.
Figure 10:
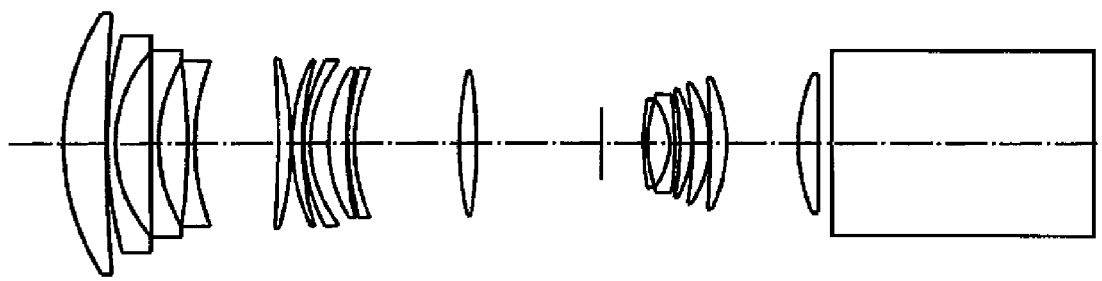
Figure 10:
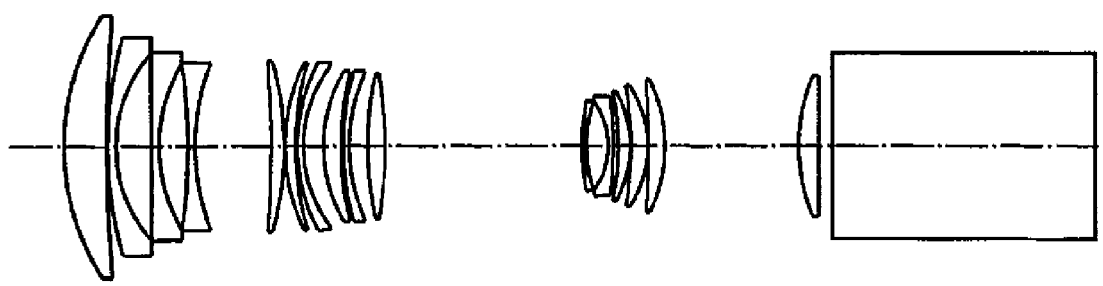

FIG. 10 shows movement positions of the lens groups at a wide angle end (WIDE), a middle position (MIDDLE), and a telephoto end (TELE), according to a power-varying operation, in the projection zoom lens of Example 5.

A radius of curvature R of each lens surface in Example 5, a center thickness of each lens, an air space D between lenses, a refractive index N of each lens at the d-line, and an Abbe number ν are shown in Table 5.

In addition, at the wide angle end (WIDE: zoom ratio 1.00), the middle position (MIDDLE: zoom ratio 1.383), and the telephoto end (TELE: zoom ratio 1.717), a distance $D_8$ (variable 1) between the first lens group $G_1$ and the second lens group $G_2$, a distance $D_{14}$ (variable 2) between the second lens group $G_2$ and the third lens group $G_3$, a distance $D_{18}$ (variable 3) between the third lens group $G_3$ and the fourth lens group $G_4$, a distance $D_{20}$ (variable 4) between the fourth lens group $G_4$ and the aperture 3, a distance $D_{21}$ (variable 5) between the aperture 3 and the fifth lens group $G_5$, and a distance $D_{31}$ (variable 6) between the fifth lens group $G_5$ and the sixth lens group $G_6$ are shown in the middle of Table 5.

Figure 17:
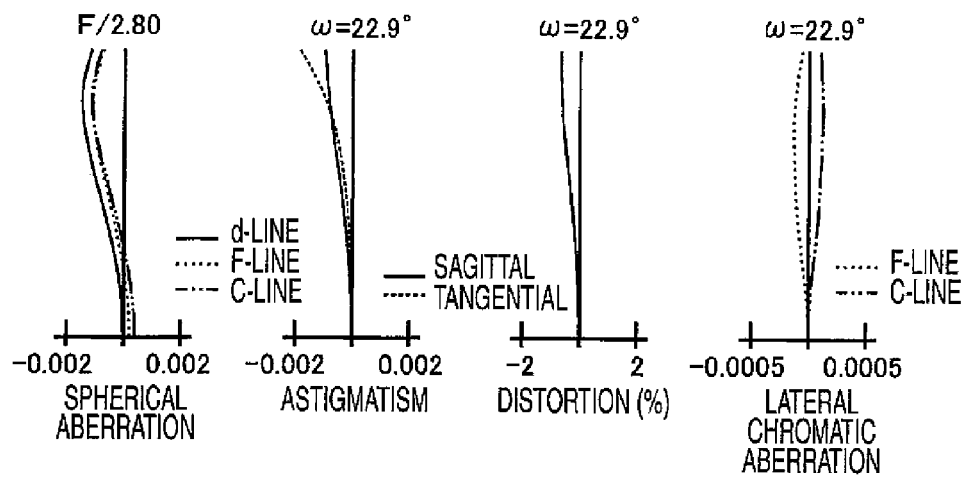
FIG. 17 is aberration diagrams of the projection zoom lens according to Example 5.
Figure 17:
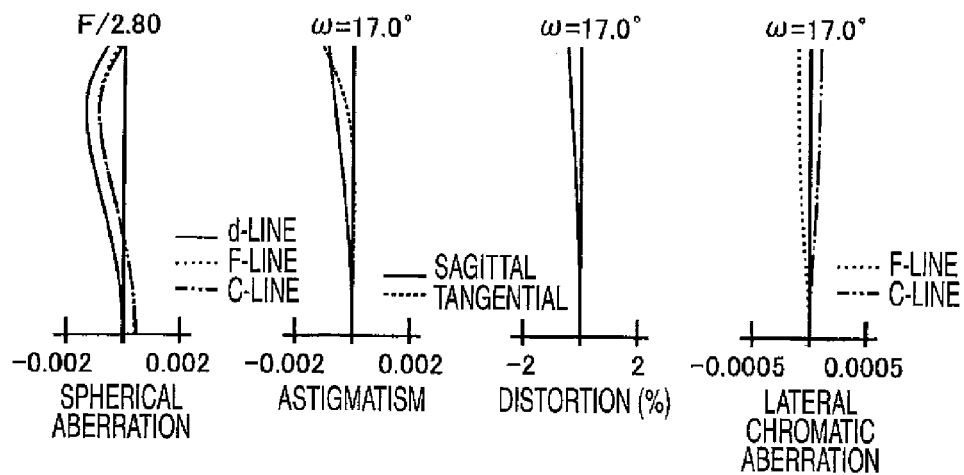
Figure 17:
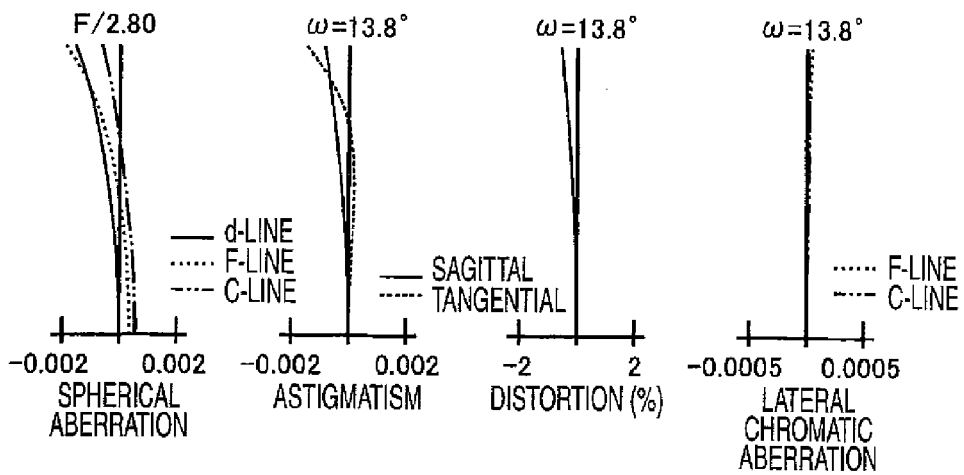

As can be seen from FIG. 17 and Table 5, aberrations are satisfactorily corrected in the whole zoom region by the projection zoom lens of Example 5. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

TABLE 5

| Surface | R | D | Nd | vd |
|---|---|---|---|---|
| 1 | 2.3791 | 0.4146 | 1.77250 | 49.6 |
| 2 | 15.3925 | 0.0066 | | |
| 3 | 3.7483 | 0.0824 | 1.49700 | 81.6 |
| 4 | 1.3385 | 0.3480 | | |
| 5 | ∞ | 0.0742 | 1.49700 | 81.6 |
| 6 | 1.5561 | 0.2842 | | |
| 7 | −5.4299 | 0.0659 | 1.80518 | 25.4 |
| 8 | 2.1807 | Variable 1 | | |
| 9 | −9.8277 | 0.1279 | 1.80518 | 25.4 |
| 10 | −2.9361 | 0.0066 | | |
| 11 | 1.8140 | 0.1043 | 1.80518 | 25.4 |
| 12 | 2.7892 | 0.0165 | | |
| 13 | 1.7139 | 0.0593 | 1.80518 | 25.4 |
| 14 | 1.2666 | Variable 2 | | |
| 15 | 1.3799 | 0.1787 | 1.49700 | 81.6 |
| 16 | 3.1534 | 0.0168 | | |
| 17 | 2.6143 | 0.0577 | 1.48749 | 70.2 |
| 18 | 1.7300 | Variable 3 | | |
| 19 | 3.0717 | 0.1713 | 1.49700 | 81.6 |
| 20 | −4.3068 | Variable 4 | | |
| 21 | Aperture diaphragm | ∞ | Variable 5 | | |
| 22 | 2.3890 | 0.0419 | 1.51742 | 52.4 |
| 23 | 1.3379 | 0.2154 | | |
| 24 | −0.7106 | 0.0499 | 1.83481 | 42.7 |
| 25 | −3.3036 | 0.0494 | | |
| 26 | −2.6127 | 0.1169 | 1.49700 | 81.6 |
| 27 | −1.0861 | 0.0066 | | |
| 28 | −3.5074 | 0.1688 | 1.49700 | 81.6 |
| 29 | −1.0424 | 0.0066 | | |
| 30 | −8.0090 | 0.1618 | 1.49700 | 81.6 |
| 31 | −1.4309 | Variable 6 | | |
| 32 | 1.7219 | 0.1977 | 1.49700 | 81.6 |
| 33 | ∞ | 0.4611 | | |
| 34 | ∞ | 2.2200 | 1.68893 | 31.1 |
| 35 | ∞ | | | |

| Zoom Ratio | Variable 1 | Variable 2 | Variable 3 | Variable 4 | Variable 5 | Variable 6 |
|---|---|---|---|---|---|---|
| 1.000 (WIDE) | 1.0921 | 0.3344 | 1.9361 | 0.1155 | 0.8395 | 0.0577 |
| 1.383 (MIDDLE) | 0.8197 | 0.1754 | 1.0374 | 1.2254 | 0.4189 | 0.6986 |
| 1.717 (TELE) | 0.7491 | 0.1947 | 0.1817 | 1.9686 | −0.0258 | 1.3070 |

| | | | | | |
|---|---|---|---|---|---|
| Conditional Expression (1) | 1.775 | Conditional Expression (2) | 1.204 | Conditional Expression (3) | 3.635 |
| Conditional Expression (4) | 1.140 (W) −1.227 (T) | Conditional Expression (5) | 81.6 | Conditional Expression (6) | 42.7 |
| Conditional Expression (7) | 1.835 | Conditional Expression (8) | 81.6 | | |

Values corresponding to the conditional expressions (1) to (8) in Example 5 are shown in the lower part of Table 5.

FIG. 17 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 5.

As shown in the spherical aberration diagrams of FIG. 17, Fno is constant as 2.80 at the wide angle end (WIDE), the middle position (MIDDLE), and the telephoto end (TELE).

The zoom ratio is set large as 1.717. Accordingly, a range of projection distance capable of coping is wide.

Example 6

A projection zoom lens according to Example 6 has a configuration as shown in FIG. 11. That is, in order from a magnification side of the lens, a first lens group $G_1$ includes a first lens $L_1$ of a negative meniscus lens having a convex surface on the magnification side, a second lens $L_2$ of a biconvex lens, a third lens $L_3$ of a negative meniscus lens having a convex surface on the magnification side, a fourth lens $L_4$ of a biconcave lens, and a fifth lens $L_5$ of a negative meniscus lens having a convex surface on the magnification side; a second lens group $G_2$ includes a sixth lens $L_6$ of a biconvex lens, a seventh lens $L_7$ of a positive meniscus lens having a convex surface on the reduction side, and an eighth lens $L_8$ of a biconcave lens; and a third lens group $G_3$ includes a ninth lens $L_9$ of a negative meniscus lens having a convex surface on the reduction side and a tenth lens $L_{10}$ of a biconvex lens.

A fourth lens group $G_4$ includes only an eleventh lens $L_{11}$ of a biconvex lens. A fifth lens group $G_5$ includes a twelfth lens $L_{12}$ of a negative meniscus lens having a convex surface on the magnification side, a thirteenth lens $L_{13}$ of a negative meniscus lens having a concave surface on the magnification side, a fourteenth lens $L_{14}$ of a biconvex lens, a fifteenth lens $L_{15}$ of a positive meniscus lens having a convex surface on the reduction side, and a sixteenth lens $L_{16}$ of a biconvex lens. A sixth lens group $G_6$ includes a seventeenth lens $L_{17}$ of a biconvex lens. The other configurations are basically the same as those of the aforementioned examples.

Figure 12:
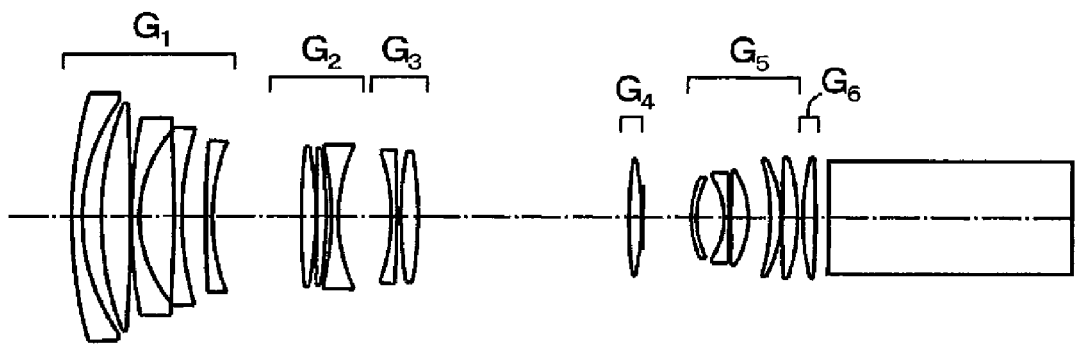
FIG. 12 is a diagram illustrating movement positions of lens groups at a wide angle end (WIDE), a middle position (MIDDLE), and a telephoto end (TELE) of the zoom lens according to Example 6.
Figure 12:
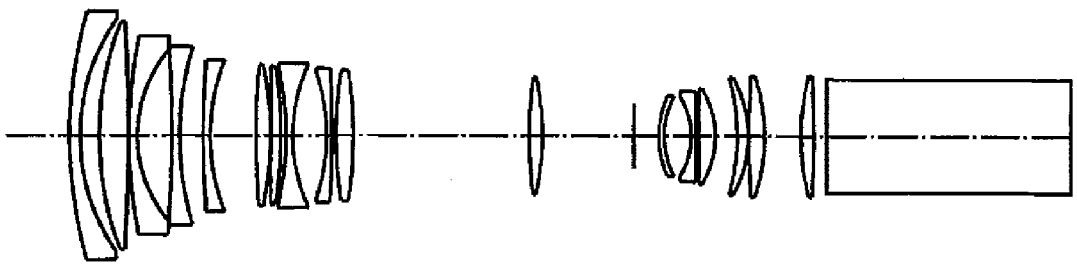
Figure 12:
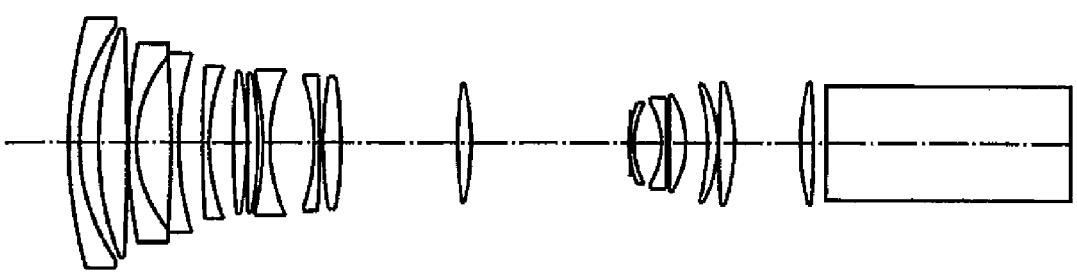

FIG. 12 shows movement positions of the lens groups at a wide angle end (WIDE), a middle position (MIDDLE), and a telephoto end (TELE), according to a power-varying operation, in the projection zoom lens of Example 6.

A radius of curvature R of each lens surface in Example 6, a center thickness of each lens, an air space D between lenses, a refractive index N of each lens at the d-line, and an Abbe number ν are shown in Table 6.

In addition, at the wide angle end (WIDE: zoom ratio 1.00), the middle position (MIDDLE: zoom ratio 1.323), and the telephoto end (TELE: zoom ratio 1.595), a distance $D_{10}$ (variable 1) between the first lens group $G_1$ and the second lens group $G_2$, a distance $D_{16}$ (variable 2) between the second lens group $G_2$ and the third lens group $G_3$, a distance $D_{20}$ (variable 3) between the third lens group $G_3$ and the fourth lens group $G_4$, a distance $D_{22}$ (variable 4) between the fourth lens group $G_4$ and the aperture 3, a distance $D_{23}$ (variable 5) between the aperture 3 and the fifth lens group $G_5$, and a distance $D_{33}$ (variable 6) between the fifth lens group $G_5$ and the sixth lens group $G_6$ are shown in the middle of Table 6.

TABLE 6

| Surface | | R | D | Nd | νd |
|---|---|---|---|---|---|
| 1 | | 7.0007 | 0.1728 | 1.67270 | 32.1 |
| 2 | | 3.2211 | 0.3073 | | |
| 3 | | 4.9923 | 0.4604 | 1.77250 | 49.6 |
| 4 | | −31.7049 | 0.0106 | | |
| 5 | | 7.9972 | 0.1329 | 1.49700 | 81.6 |
| 6 | | 2.0971 | 0.5429 | | |
| 7 | | −21.6852 | 0.1223 | 1.49700 | 81.6 |
| 8 | | 4.8129 | 0.3719 | | |
| 9 | | 14.5548 | 0.1116 | 1.80518 | 25.4 |
| 10 | | 3.1522 | Variable 1 | | |
| 11 | | 11.4784 | 0.2300 | 1.83400 | 37.2 |
| 12 | | −5.7316 | 0.0106 | | |
| 13 | | −260.5228 | 0.1581 | 1.80518 | 25.4 |
| 14 | | −6.3937 | 0.0842 | | |
| 15 | | −4.6762 | 0.1063 | 1.49700 | 81.6 |
| 16 | | 2.6940 | Variable 2 | | |
| 17 | | −3.0839 | 0.0797 | 1.49700 | 81.6 |
| 18 | | −25.7029 | 0.0657 | | |
| 19 | | 6.3027 | 0.2826 | 1.69680 | 55.5 |
| 20 | | −6.1608 | Variable 3 | | |
| 21 | | 6.9187 | 0.2092 | 1.49700 | 81.6 |
| 22 | | −4.3298 | Variable 4 | | |
| 23 | Aperture diaphragm | ∞ | Variable 5 | | |
| 24 | | 1.5654 | 0.0797 | 1.48749 | 70.2 |
| 25 | | 1.2931 | 0.4447 | | |
| 26 | | −1.1927 | 0.0797 | 1.83481 | 42.7 |
| 27 | | −30.1186 | 0.0368 | | |
| 28 | | 23.2598 | 0.2727 | 1.49700 | 81.6 |
| 29 | | −1.4272 | 0.3482 | | |
| 30 | | −3.3025 | 0.1710 | 1.49700 | 81.6 |
| 31 | | −1.9416 | 0.0106 | | |
| 32 | | 14.7092 | 0.2527 | 1.49700 | 81.6 |
| 33 | | −2.9998 | Variable 6 | | |
| 34 | | 3.9496 | 0.1971 | 1.49700 | 81.6 |
| 35 | | −21.4625 | 0.7435 | | |
| 36 | | ∞ | 3.5800 | 1.68893 | 31.1 |
| 37 | | ∞ | | | |

| Zoom Ratio | Variable 1 | Variable 2 | Variable 3 | Variable 4 | Variable 5 | Variable 6 |
|---|---|---|---|---|---|---|
| 1.000 (WIDE) | 1.4269 | 0.8490 | 3.3944 | 0.0133 | 0.7835 | 0.0797 |
| 1.323 (MIDDLE) | 0.7345 | 0.5445 | 2.8244 | 1.4657 | 0.4051 | 0.5725 |
| 1.595 (TELE) | 0.3795 | 0.7154 | 1.8664 | 2.5647 | −0.0200 | 1.0409 |

| | | | | | | |
|---|---|---|---|---|---|---|
| Conditional Expression (1) | 2.860 | Conditional Expression (2) | 0.822 | Conditional Expression (3) | 5.386 |
| Conditional Expression (4) | 1.050 (W) −1.112 (T) | Conditional Expression (5) | 81.6 | Conditional Expression (6) | 42.7 |
| Conditional Expression (7) | 1.835 | Conditional Expression (8) | 81.6 | | |

Values corresponding to the conditional expressions (1) to (8) in Example 6 are shown in the lower part of Table 6.

Figure 18:
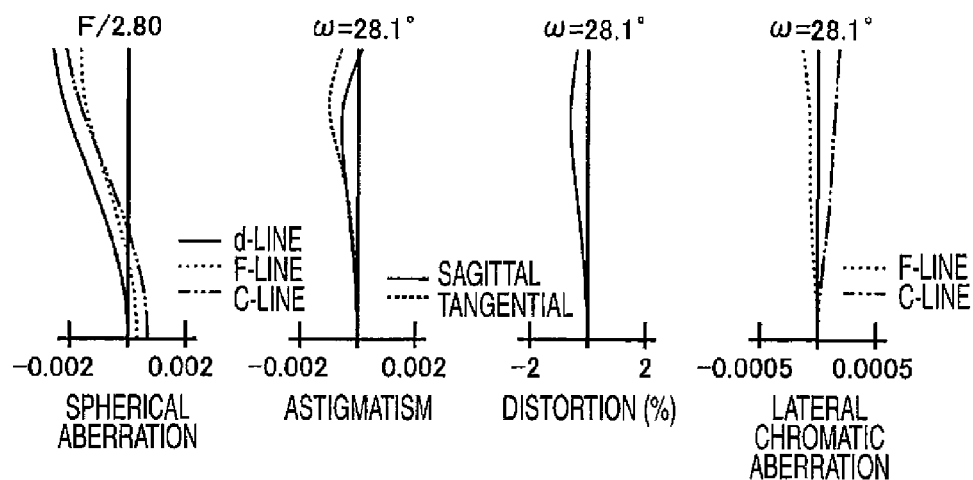
FIG. 18 is aberration diagrams of the projection zoom lens according to Example 6.
Figure 18:
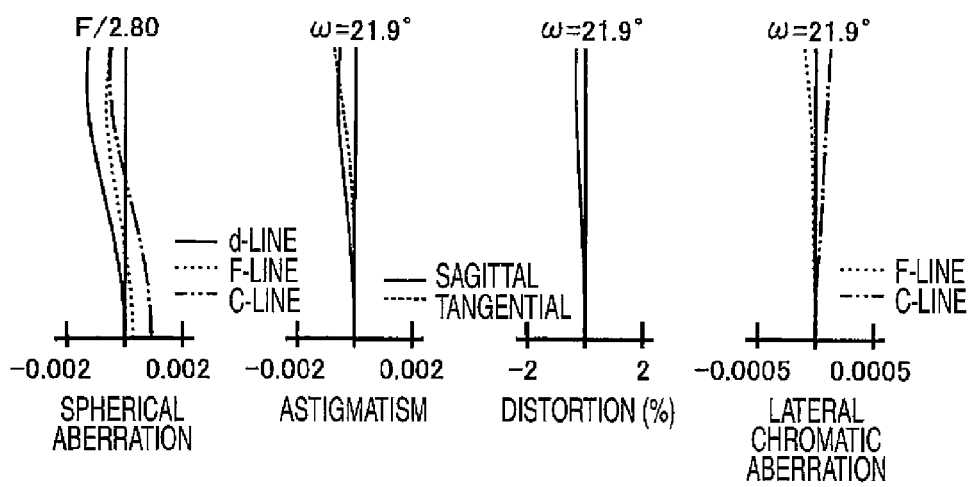
Figure 18:
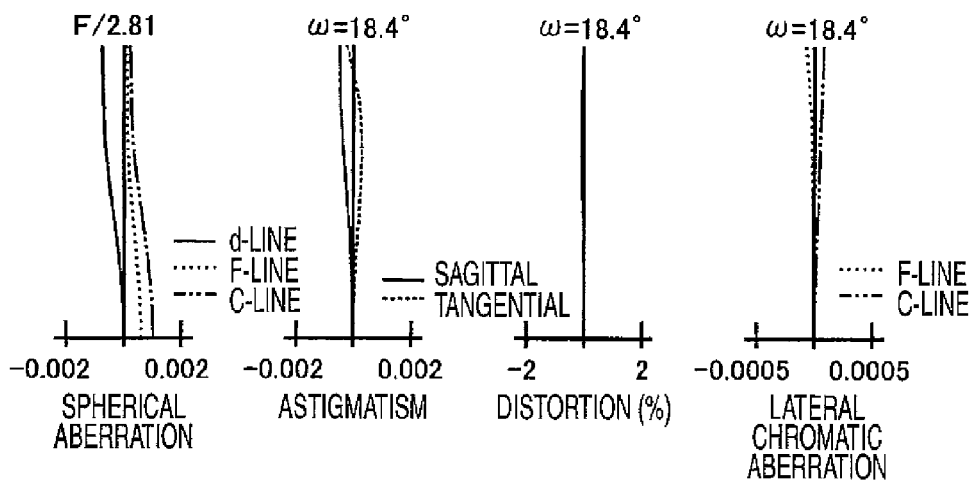

FIG. 18 is an aberration diagram illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 6.

As shown in the spherical aberration diagrams of FIG. 18, Fno is constant as 2.80 to 2.81 at the wide angle end (WIDE), the middle position (MIDDLE), and the telephoto end (TELE).

As can be seen from FIG. 18 and Table 6, aberrations are satisfactorily corrected in the whole zoom region by the projection zoom lens of Example 6. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.595. Accordingly, a range of projection distance capable of coping is wide.

Modification Example

As described above, in Examples, speed is prescribed by the aperture diaphragm 3 having a constant diameter, but a variable aperture diaphragm may be used instead of the aperture diaphragm 3.

For example, in the projection zoom lens according to Example 1, when a variable aperture diaphragm is disposed instead of the aperture diaphragm 3, the variable aperture diaphragm is disposed preferably at a position (substantially the same position as the case of the aperture 3) shown in Table 7.

TABLE 7

| Zoom Ratio | Variable 4 | Variable 5 | Aperture Diaphragm Radius |
|---|---|---|---|
| 1.000 (WIDE) | 0.2077 | 0.8543 | 0.4414 |
| 1.255 (MIDDLE) | 1.0661 | 0.6955 | 0.4524 |
| 1.460 (TELE) | 1.5883 | 0.5596 | 0.4653 |

In Table 7, only a part (variable 4, variable 5) different from Example 1 is extracted and shown, and a radius of a variable aperture diaphragm at the wide angle end (WIDE), the middle position (MIDDLE), and the telephoto end (TELE) is shown.

As described above, the variable aperture diaphragm is disposed at the position of the real aperture diaphragm, thereby Fno can be changed in the whole zoom region while keeping satisfactory telecentricity. Accordingly, for example, it is possible to lower Fno to improve a contrast.

What is claimed is:

1. A zoom lens for projection comprising, in order from a magnification side of the zoom lens:
    a first lens group having a negative refractive power and adapted to perform focusing with being fixed during power-varying of the zoom lens;
    a second lens group having a positive refractive power and adapted to move during the power-varying;
    a third lens group having a positive refractive power and adapted to move during the power-varying;
    a fourth lens group having a positive refractive power and adapted to move during the power-varying;
    a stop adapted to independently move during the power-varying;
    a fifth lens group having a positive refractive power and adapted to move during the power-varying; and
    a sixth lens group having a positive refractive power and adapted to be fixed during the power-varying,
    wherein a reduction side of the zoom lens is configured to be telecentric,
    Fno is constant in a whole region of the power-varying, and the zoom lens satisfy conditional expression (1):

$$1.7 < Bf/f < 3.0 \quad (1)$$

wherein f is a focal length of the zoom lens at a wide angle end, and Bf is a back focal length of the zoom lens in air converted distance.

2. The zoom lens according to claim 1, wherein the stop is adapted to move independently from the first to sixth lens groups and to have a constant aperture diameter, during the power-varying, and the zoom lens satisfies conditional expression (2):

$$0.8 < (f_{1-5} T \times D_1 W)/(f_{1-4} W \times D_2 T) < 2.5 \quad (2)$$

wherein $f_{1-4}W$ is a composite focal length from the first lens group to the fourth lens group at the wide angle end, $f_{1-5}T$ is a composite focal length from the first lens group to the fifth lens group at a telephoto end, $D_1W$ is a distance between the fourth lens group and the fifth lens group at the wide angle end, and $D_2T$ is a distance between the fifth lens group and the sixth lens group at the telephoto end.

3. The zoom lens according to claim 1, wherein each lens in the zoom lens is a single lens.

4. The zoom lens according to claim 1, satisfying conditional expression (3):

$$3.0 < f4/f < 6.0 \quad (3)$$

wherein f4 is a focal length of the fourth lens group.

5. The zoom lens according to claim 1, satisfying conditional expression (4):

$$1.0 < f_{5-6}/Bf < 1.5 \quad (4)$$

wherein $f_{5-6}$ is a composite focal length of the fifth lens group and the sixth lens group.

6. The zoom lens according to claim 1, wherein the fourth lens group is one biconvex lens and satisfies conditional expression (5):

$$70 < vd1 \quad (5)$$

wherein vd1 is an Abbe number of the biconvex lens of the fourth lens group at the d-line.

7. The zoom lens according to claim 1, wherein the fifth lens group includes: in order from the magnification side, a negative lens having a concave surface on the magnification side, a negative lens having a convex surface on the magnification side, and a plurality of positive lenses having convex surfaces on the reduction side.

8. The zoom lens according to claim 7, satisfying conditional expressions (6) and (7):

$$40 < vd2 \quad (6)$$

$$1.8 < Nd2 \quad (7)$$

wherein vd2 is an Abbe number of the negative lens having the concave surface on the magnification side in the fifth lens group at the d-line, and Nd2 is a refractive index of the negative lens having the concave surface on the magnification side in the fifth lens group at the d-line.

9. The projection zoom lens according to claim 7, satisfying conditional expression (8):

$$70 < vd3 \quad (8)$$

wherein vd3 is an Abbe number of the positive lens having the convex surface on the reduction side in the fifth lens group at the d-line.

10. A projection display device comprising:
a light source;
a light valve; and
a projection zoom lens according to claim 1 as a projection lens for projecting an optical image onto a screen by light modulated by the light valve.

11. The zoom lens according to claim 2, wherein each lens in the zoom lens is a single lens.

12. The zoom lens according to claim 2, satisfying conditional expression (3):

$$3.0 < f4/f < 6.0 \qquad (3)$$

wherein f4 is a focal length of the fourth lens group.

13. The zoom lens according to claim 2, satisfying conditional expression (4):

$$1.0 < f_{5-6}/Bf < 1.5 \qquad (4)$$

wherein $f_{5-6}$ is a composite focal length of the fifth lens group and the sixth lens group.

14. The zoom lens according to claim 2, wherein the fourth lens group is one biconvex lens and satisfies conditional expression (5):

$$70 < vd1 \qquad (5)$$

wherein vd1 is an Abbe number of the biconvex lens of the fourth lens group at the d-line.

15. The zoom lens according to claim 2, wherein the fifth lens group includes: in order from the magnification side, a negative lens having a concave surface on the magnification side, a negative lens having a convex surface on the magnification side, and a plurality of positive lenses having convex surfaces on the reduction side.

16. The zoom lens according to claim 15, satisfying conditional expressions (6) and (7):

$$40 < vd2 \qquad (6)$$

$$1.8 < Nd2 \qquad (7)$$

wherein vd2 is an Abbe number of the negative lens having the concave surface on the magnification side in the fifth lens group at the d-line, and Nd2 is a refractive index of the negative lens having the concave surface on the magnification side in the fifth lens group at the d-line.

17. The projection zoom lens according to claim 15, satisfying conditional expression (8):

$$70 < vd3 \qquad (8)$$

wherein vd3 is an Abbe number of the positive lens having the convex surface on the reduction side in the fifth lens group at the d-line.

18. A projection display device comprising:
a light source;
a light valve; and
a projection zoom lens according to claim 2 as a projection lens for projecting an optical image onto a screen by light modulated by the light valve.

* * * * *